(12) United States Patent
Usuda et al.

(10) Patent No.: US 9,240,719 B2
(45) Date of Patent: Jan. 19, 2016

(54) SWITCHING POWER SUPPLY DEVICE

(75) Inventors: Takeshi Usuda, Toyama (JP); Yoshiki Matsuo, Hachioji (JP)

(73) Assignee: COSEL CO. LTD., Toyama-Shi, Toyama (JP)

( * ) Notice: Subject to any disclaimer, the term of this patent is extended or adjusted under 35 U.S.C. 154(b) by 183 days.

(21) Appl. No.: 14/235,032

(22) PCT Filed: Jul. 25, 2012

(86) PCT No.: PCT/JP2012/068834
§ 371 (c)(1),
(2), (4) Date: Jan. 24, 2014

(87) PCT Pub. No.: WO2013/015314
PCT Pub. Date: Jan. 31, 2013

(65) Prior Publication Data
US 2014/0159694 A1  Jun. 12, 2014

(30) Foreign Application Priority Data

Jul. 26, 2011 (JP) .................... 2011-163493

(51) Int. Cl.
*H02M 3/156* (2006.01)
*H02M 3/158* (2006.01)
*H02M 3/157* (2006.01)

(52) U.S. Cl.
CPC ............. *H02M 3/158* (2013.01); *H02M 3/157* (2013.01); *Y02B 70/1466* (2013.01)

(58) Field of Classification Search
CPC ..... H02M 3/155; H02M 3/156; H02M 3/157; H02M 3/1582; H02M 2003/1566
See application file for complete search history.

(56) References Cited

U.S. PATENT DOCUMENTS 7,911,816 B2 * 3/2011 Miramonti ............ H02M 3/156
                                                    219/663
8,253,402 B2 * 8/2012 Kenly ................. H02M 3/1588
                                                    323/282

(Continued)

FOREIGN PATENT DOCUMENTS

JP    2000-014143 A    1/2000
JP    2005-184964 A    7/2005
JP    2011-091974 A    5/2011

OTHER PUBLICATIONS

Machine Translation of JP 2011036047 A (Chang, Ye-Then), Feb. 2011.*

(Continued)

*Primary Examiner* — Jessica Han
*Assistant Examiner* — Bart Iliya
(74) *Attorney, Agent, or Firm* — Holtz, Holtz, Goodman & Chick PC

(57) ABSTRACT

A control circuit (24) includes a calculation means (28) which determines ON time and OFF time of a main switching element (14) and a drive pulse generating means (30) which generates drive pulses that turn the main switching element (14) ON and OFF. A control function formula which prescribes a relationship between an output voltage (Vo) and an output differential value (Vd) by a negative linear function and the like is defined in the calculation means (28). The calculation means (28) samples an input voltage signal (Vi) and an output voltage signal (Vo) at a timing synchronized with a switching cycle of the main switching element (14), and calculates the ON time and OFF time of the main switching element (14) thereafter so as to satisfy the control function formula. The drive pulse generating means (30) generates drive pulses (V14) which turn the main switching element (14) ON and OFF on the basis of the ON and OFF time determined by the calculation means (28).

19 Claims, 24 Drawing Sheets

(56) References Cited

U.S. PATENT DOCUMENTS

| | | | |
|---|---|---|---|
| 2007/0112443 A1 | 5/2007 | Latham et al. | |
| 2007/0247129 A1 | 10/2007 | Jacobs | |
| 2008/0203992 A1* | 8/2008 | Qahouq | H02M 3/157 323/299 |
| 2010/0127682 A1 | 5/2010 | Kenly et al. | |
| 2011/0096571 A1 | 4/2011 | Usuda et al. | |
| 2013/0169281 A1* | 7/2013 | Baba | G01R 31/3651 324/426 |

OTHER PUBLICATIONS

Extended European Search Report dated Mar. 31, 2015, issued in counterpart European Application No. 12818011.4.

International Preliminary Report on Patentability (IPRP) and Written Opinion dated Feb. 6, 2014 issued in International Application No. PCT/JP2012/068834.

International Search Report (ISR) dated Oct. 30, 2012 (and English translation thereof) issued in International Application No. PCT/JP2012/068834.

* cited by examiner (a)

(b)

(a)

(b)

SWITCHING POWER SUPPLY DEVICE

BACKGROUND OF THE INVENTION

1. Field of the Invention

The present invention relates to a switching power supply device which stabilizes an output voltage using a digital control circuit.

2. Description of the Related Art

In a related art switching power supply device, an output voltage is stabilized by, for example, pulse width modulation (PWM) control or pulse frequency modulation (PFM) control using a highly intelligent digital control circuit with, for example, a digital processor. Especially recently, it is urgently required to reduce a transient fluctuation in an output voltage in response to a sudden change in an external environment of the power supply device.

Exemplary situations of sudden changes in an external environment of the switching power supply device may include a sudden change in an input voltage during operation or a sudden increase or decrease in an output current in response to a change in a state of a load. A starting operation of the switching power supply device when an input voltage is placed in the switching power supply device which is not in operation also becomes a problem.

For example, a switching power supply device used in information and communication equipment or a server needs to have high speed response characteristics of output voltage control in response to a sudden change in the load because a situation in which an output current suddenly changes from about zero to rated load may occur frequently. Further, in a system in which a plurality of board substrates are supplied with voltage from a single input power line, it is assumed that, when another board substrate is hot swapped during maintenance, a loading state of the power source line of the system changes and an input voltage of the switching power supply device which receives power supply from the power source line changes suddenly. Therefore, the switching power supply device used in this kind of system needs to have high speed response characteristics of output voltage control in response to a sudden change in the input. As a general matter, if overshoot or vibration occur when an input voltage is placed and an output voltage increases from zero to reach a predetermined output voltage, there is a possibility that electronic equipment as a load may malfunction or break down. Therefore, a switching power supply device needs to start with an output voltage thereof increasing monotonously.

In order to solve these problems, as disclosed in, for example, PTL 1, a switching power supply device which obtains a signal corresponding to an input voltage during operation (input voltage signal), a signal corresponding to an output voltage (output voltage signal) and a signal corresponding to an output voltage differential value which represents a change in the output voltage (output differential signal), performs a predetermined digital calculation process on the basis of each signal, and determines ON time and OFF time of a main switching element is proposed. In this switching power supply device, a control function formula which is a negatively sloped linear function and which prescribes a relationship between an output voltage signal and an output differential value is defined in a calculation means of a control circuit. The calculation means samples the input voltage signal, the output voltage signal and the output differential signal at a timing synchronized with the switching cycle of the main switching element, and calculates the ON time and OFF time of the main switching elements thereafter so as to satisfy the control function formula described above. The drive pulse generating means generates drive pulses which turn the main switching element ON and OFF, on the basis of the ON and OFF time determined by the calculation means. At this time, the output differential signal is obtained by a capacitor current detection means which measures a current of a smoothing capacitor, or a differential means which differentiates the output voltage signal.

CITATION LIST

Patent Literature

PTL 1: Japanese Unexamined Patent Application Publication No. 2011-91974

SUMMARY OF THE INVENTION

However, in the case of the switching power supply device of PTL 1, both the input voltage signal and the output voltage signal are obtained by simply digitizing analog information of the input voltage and the output voltage by an A/D converter and thus it is not easy to obtain the output differential signal. For example, in a method in which a current which flows in a smoothing capacitor is measured and analog information thereof is digitized to obtain output differential signal, it is usually required that a current-voltage conversion circuit is provided by which a capacitor current is converted into a voltage signal and then the voltage signal is digitized by the A/D converter. There is therefore a problem that the power supply device becomes large in size and that loss increases. In a method in which an output voltage signal digitized by an A/D converter is differentiated to obtain an output differential signal, a delay in control due to an increase in the number of times of calculation becomes a problem. Therefore, in order to perform a high-speed operation of the control circuit, it has been necessary to lower the function of the control circuit so as to reduce the number of times of calculation or to use an expensive microcomputer capable of high-speed operation.

The present invention has been made in view of the aforementioned related art, and an object thereof is to provide a digital control switching power supply device provided with high speed response performance for reducing a fluctuation in a transient output voltage in response to a sudden change in external environments of the power supply device, and capable of reducing size and cost.

The present invention is a switching power supply device which includes a power converter circuit including a main switching element which performs ON and OFF operations and a control circuit which stabilizes an output voltage by controlling the ON and OFF operations, wherein: the control circuit includes a calculation means which determines ON time and OFF time of the main switching element, and a drive pulse generating means which generates a drive pulse which turns the main switching element ON and OFF; a control function formula is defined in the calculation means, the control function formula being a continuous function formula which includes, as variables, an output voltage and an output differential value representing a fluctuation in the output voltage, and a relationship between the two variables being that only a single output differential value exists corresponding to a single value of the output voltage, the control function formula prescribing that a corresponding output differential value becomes positive when the output voltage is below a target value of stabilization of the output voltage, that the corresponding output differential value becomes negative when the output voltage is above the target value, and that a corresponding output differential value becomes zero when the output voltage is equal to the target value; the calculation means samples an input voltage signal of which input voltage has been detected and an output voltage signal of which output voltage has been detected or estimated at timings in synchronization with a switching cycle of the main switching element, performs a calculation process to calculate at least one of ON time and OFF time of the main switching element in the switching cycle after the sampling timing such that the output voltage signal and the output differential value at the next sampling timing or thereafter derived on the basis of the two sampled signals satisfy the relationship prescribed in the control function formula; and the drive pulse generating means generates the drive pulses such that the main switching element is turned ON and OFF in a switching cycle after the sampling timing of the above-described two signals on the basis of the ON time and the OFF time determined by the calculation means.

The calculation means may perform the sampling of each signal and the calculation process for calculating at least one of the ON time and the OFF time for every switching cycle of the main switching element. In that case, the power converter circuit stops supplying power to an output from an input DC power supply and excites a built-in inductance element by the input DC power supply during an ON period of the main switching element, and releases excitation energy accumulated in the inductance element to the output and supplies power during an OFF period of the main switching element; and the calculation means performs the sampling of each signal during the period during which the inductance element is releasing excitation energy. The drive pulse generation means generates a drive pulse in which the same periods are defined as the ON period of the main switching element before and after a midpoint of the sampling cycle of each signal, or generates a drive pulse in which the same periods are defined as the OFF period of the main switching element before and after the midpoint of the cycle of sampling.

The power converter circuit may supply power to an output from the input DC power supply and excite a built-in inductance element by the input DC power supply during the ON period of the main switching element, and release excitation energy accumulated in the inductance element to the output so as to continuously supply the power during the OFF period of the main switching element; the calculation means may perform the sampling of each signal and the calculation process for calculating at least one of the ON time and OFF time in half the cycle of the switching cycle of the main switching element; and the drive pulse generation means may generate a drive pulse in which periods before and after a second sampling timing in one switching cycle are defined as the ON period of the main switching element or generate a drive pulse in which periods before and after a second sampling timing in one switching cycle are defined as the OFF period of the main switching element.

The control circuit is provided with a state variable estimation means which estimates, using a detected value of a specific circuit component, an operating state of a location which is difficult to be detected; the state variable estimation means obtains, at the timing at which the calculation means samples the input voltage signal, an input voltage signal and an output voltage signal of which output voltage has been detected, and obtains the ON time and the OFF time determined by the calculation means immediately therebefore and, on the basis of the obtained input voltage signal, the output voltage signal, the ON time and the OFF time, performs a process to estimate an output voltage signal at the next sampling timing; and the calculation means samples the input voltage signal, the output voltage signal, the ON time, the OFF time and the output voltage signal estimated by the state variable estimation means, and performs the above-described calculation process on the basis thereof.

On the basis of the obtained input voltage signal, the output voltage signal, the ON time and the OFF time, the state variable estimation means may perform a process to estimate an output voltage signal at the next sampling timing and a voltage drop component caused by parasitic impedance which exists on a path on which an output current flows; and the calculation means may sample the input voltage signal, the output voltage signal, the ON time and the OFF time, and the output voltage signal and the voltage drop component estimated by the state variable estimation means and perform the above-described calculation process on the basis thereof. Further, in the control function formula defined in the calculation means, the relationship between the output voltage and the output differential value may be prescribed by a negatively sloped linear function formula.

In the control function formula defined in the calculation means, the output differential value is prescribed to be constant irrespective of the output voltage in a range in which a difference between the output voltage and the target value exceeds a predetermined value.

The calculation means calculates both the ON time and the OFF time such that the total of the ON time and the OFF time becomes constant. Alternatively, the calculation means calculates the OFF time such that the ON time becomes constant. Alternatively, the calculation means may calculate the ON time such that the OFF time becomes constant. In that case, when the ON time and the OFF time determined by the calculation means exceed the maximum time ratio which is variable as an ON-time ratio, the drive pulse generation means generates a drive pulse with which the main switching element is turned ON or OFF at the maximum time ratio; and when the ON time and the OFF time determined by the calculation means are below the minimum time ratio which is variable as an ON-time ratio, the drive pulse generation means generates a drive pulse with which the main switching element is turned ON or OFF at the minimum time ratio.

The calculation means may calculate both the ON time and the OFF time such that the ON-time ratio to the switching cycle becomes constant. In that case, when the total value of the ON time and the OFF time determined by the calculation means exceeds the maximum time which is variable, the drive pulse generating means generates a drive pulse which turns the main switching element ON and OFF in the maximum time; and when the total value of the ON time and the OFF time determined by the calculation means becomes shorter than the minimum time which is variable, the drive pulse generating means generates a drive pulse which turns the main switching element ON and OFF in the minimum time.

The calculation means performs parameter estimation about a circuit constant which is initially set as a default value, and updates the circuit constant such that a difference between an actual output voltage signal sampled by the calculation means and an output voltage signal at the sampling timing predicted when the ON time and the OFF time are determined in the past becomes small. A composite constant which is a constant constituted by a combination of a plurality of the circuit constants is defined, and the parameter estimation is performed in a unit of the composite constant. Further, the parameter estimation on the basis of the circuit constant or the composite constant may be performed using the off-line least square method.

For example, the power converter circuit is a step-down chopper circuit provided with the main switching element which turns an input voltage ON and OFF, a rectifying element which is turned ON and OFF complementarily with the main switching element, and a smoothing inductor and a smoothing capacitor which smooth intermittent voltages at both ends of the rectifying element; in the calculation processing circuit, a switching cycle T of the main switching element, inductance L of the smoothing inductor, capacitance C of the smoothing capacitor, the output current Io and the composite constants p and Vofs defined by the following Formulae (1) and (2) using a resistance value R of parasitic resistance of the smoothing inductor are initially set as default values,

[Formula 1]

$$p = \frac{T^2}{2 \cdot L \cdot C} \quad (1)$$

[Formula 2]

$$Vofs = -\frac{T^2}{L \cdot C} \cdot R \cdot Io \quad (2)$$

the calculation means periodically updates the composite constants p and Vofs by parameter estimation during a power supply operation; the parameter estimation is performed by the calculation means which obtains each value of output voltage signals Vo(k), Vo(k−1), Vo(k−2), Vi(k−1) and Vi(k−2) which are detected values sampled for each timing t(k), t(k−1) and t(k−2), and obtains each value of δ(k−1) and δ(k−2) calculated as the time ratio for each timing t(k−1) and t(k−2), and calculates the composite constants p and Vofs with which an evaluation function J(N) represented by the following Formulae (3) to (5) including above-described each value becomes the minimum.

[Formula 3]

$$J(N) = \frac{1}{N} \sum_{k=1}^{N} [v1(k) - p \cdot v2(k) - Vofs]^2 \quad (3)$$

[Formula 4]

$$v1(k) = Vo(k) - [2 \cdot Vo(k-1) - Vo(k-2)] \quad (4)$$

[Formula 5]

$$v2(k) = \\ -Vo(k-1) - Vo(k-2) + Vi(k-1) \cdot \delta(k-1) + Vi(k-2) \cdot \delta(k-2) \quad (5)$$

Further, the calculation means causes slight diffusion and fluctuation of the ON time and the OFF time determined through the above-described calculation process for every timing at which the parameter estimation is performed, and samples each signal during a period during which the output voltage is fluctuated by the diffusion fluctuation to perform the parameter estimation.

The switching power supply device of the present invention calculates the ON and OFF time and the like so as to satisfy the control function described above on the basis of two signals, i.e., an input voltage signal and an output voltage signal, which are detected values, and controls ON and OFF of the main switching element. Therefore, high speed response characteristics to a sudden change in external environments of the power supply device can be implemented by a simple and inexpensive control circuit.

Further, by employing a configuration in which an output voltage signal is estimated using a state variable estimation means, an influence of an operation delay of the control circuit can be minimized even if an inexpensive and low-speed microcomputer is used. Further, by employing a configuration in which the state variable estimation means also estimates a signal corresponding to an output current (for example, the voltage drop component), control in consideration of an influence of parasitic impedance on a path in which the output current flows becomes possible and thus precision in output voltage control can be improved.

Further, by employing a configuration in which parameter estimation is performed about a circuit constant initially set as a default value and the circuit constant is updated periodically, influences of an individual difference of the impedance of each circuit device (a resistance value, inductance, capacitance, conduction resistance of semiconductors and the like), a temperature change and variation with time are reliably canceled. Therefore, output voltage control can be performed more precisely.

DETAILED DESCRIPTION OF THE EMBODIMENTS

Figure 1:
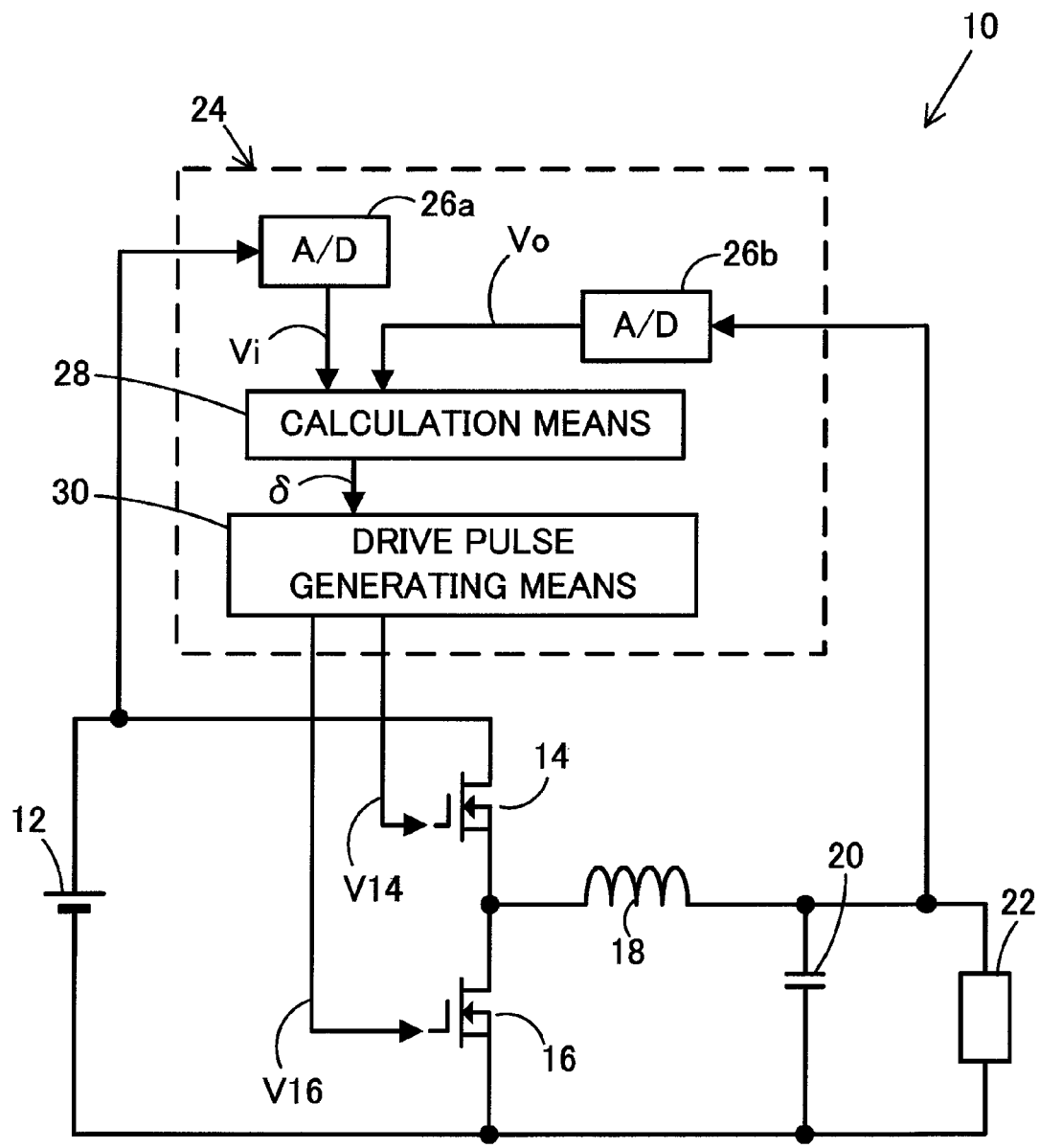
FIG. 1 is a circuit diagram illustrating a first embodiment of a switching power supply device of the present invention.

Hereinafter, a first embodiment of a switching power supply device of the present invention will be described with reference to FIGS. 1 to 5. A switching power supply device 10 of the first embodiment includes: a main switching element 14 which turns an input voltage supplied from an input DC power supply 12 ON and OFF; a rectifying element 16 which is connected between an output side of the main switching element 14 and the ground and is turned ON and OFF complementarily with the main switching element 14; and a smoothing inductor 18 and a smoothing capacitor 20 which altogether constitute a low pass filter that smoothes intermittent voltages generated at both ends of the rectifying element 16. A DC output voltage generated at both ends of the smoothing capacitor 20 is supplied to a load 22. The main switching element 14 and the rectifying element 16 are N-channel MOSFETs and are turned ON and OFF by drive pulses of a predetermined time ratio output from a control circuit 24 which stabilizes output voltages.

A circuit of this switching power supply device 10 is a common power converter circuit called a step-down chopper circuit which supplies the output side load 22 with power from the input DC power supply 12 during an ON period of the main switching element 14 and, at the same time, excites the built-in smoothing inductor 18 by the input DC power supply 12. Further, the switching power supply device 10 operates to continue power supply to the load 22 by releasing excitation energy accumulated in the smoothing inductor 18 also during the OFF period of the main switching element 14.

The control circuit 24 includes a plurality of analog-to-digital converters (hereafter, referred to as "A/D converters") 26a and 26b, a calculation means 28 and a drive pulse generating means 30. Analog information of which input voltage has been detected is input in the A/D converter 26a. The A/D converter 26a samples the input analog information at timings in synchronization with a switching cycle of the main switching element 14, i.e., at predetermined timings during the ON time of the main switching element 14 or during a period during which the smoothing inductor 18 is releasing the excitation energy. The A/D converter 26a converts the sampled analog information into an input voltage signal Vi as digital information and outputs the same. Analog information of which output voltage has been detected is input in the A/D converter 26b, which converts the input analog information into an output voltage signal Vo as digital information in a similar sampling cycle and outputs the same.

A control function formula which includes an output voltage and an output differential value as variables and prescribes a relationship between these variables is defined in the calculation means 28. The control function formula is a continuous function formula which includes a target value of stabilization of the output voltage as a constant and in which only a single output differential value corresponding to a single value of the output voltage exists. The control function formula prescribes the following relationships: when an output voltage is in below the target value, a corresponding output differential value is positive; when an output voltage is above the target value, a corresponding output differential value is negative; and when an output voltage is equal to the target value, a corresponding output differential value is zero.

Here, the control function formula is a negatively sloped linear function formula which, in particular, prescribes the relationship between the output voltage and the output differential value as expressed by Formula (6).

[Formula 6]

$$Vd = -\frac{1}{\tau}(Vo - Vref) \qquad (6)$$

In Formula (6), Vo represents the output voltage and Vd represents the output differential value. τ represents a positive constant and (−1/τ) represents the slope. Vref is a target value of a stabilized output voltage. The output differential value Vd corresponds to a value obtained by dividing a capacitor current Ic which flows in the smoothing capacitor 20 by the capacitance C.

The calculation means 28 samples, from the A/D converters 26a and 26b in the sampling cycle described above, an input voltage signal Vi of which input voltage is detected and an output voltage signal Vo of which output voltage is detected. The calculation means 28 then performs a predetermined calculation process on the basis of these two signals and the like and calculates the ON time and the OFF time of the main switching element 14 after the sampling such that a relationship between an output voltage Vo to be detected at the next sampling timing and an output differential value Vd at that time satisfy Formula (6). Here, the ON and OFF time are calculated under conditions that the total of the ON and OFF time is kept constant and that certain PWM control is performed such that the switching cycle becomes constant.

The drive pulse generating means 30 generates a drive pulse V14 for the main switching element 14 and a drive pulse V16 for the rectifying element 16 on the basis of the ON and OFF time (the switching cycle and a time ratio δ in which the main switching element is turned ON) determined by the calculation means 28. The drive pulse V14 has a certain switching cycle T. The drive pulse V14 indicates a high level during a period of the time ratio δ during which the main switching element 14 is turned ON and indicates a low level during other periods. The drive pulse V16 is a pulse voltage synchronized with and having the opposite phase with the drive pulse V14. The drive pulse V16 indicates a low level during a period of the time ratio δ during which the rectifying element 16 is turned OFF and indicates a high level during other periods.

Figure 2:
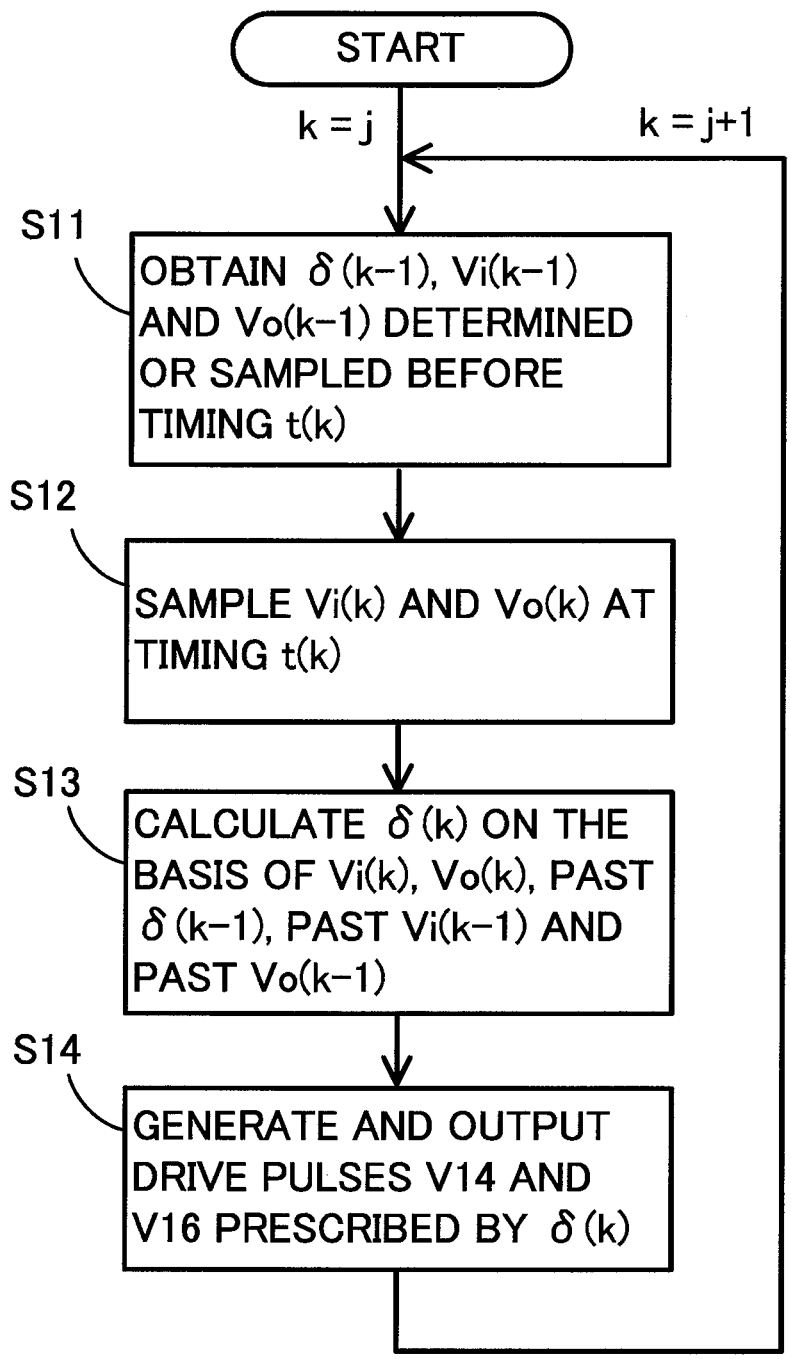
FIG. 2 is a flowchart illustrating a steady-state operation of the first embodiment of the present invention.
Figure 3:
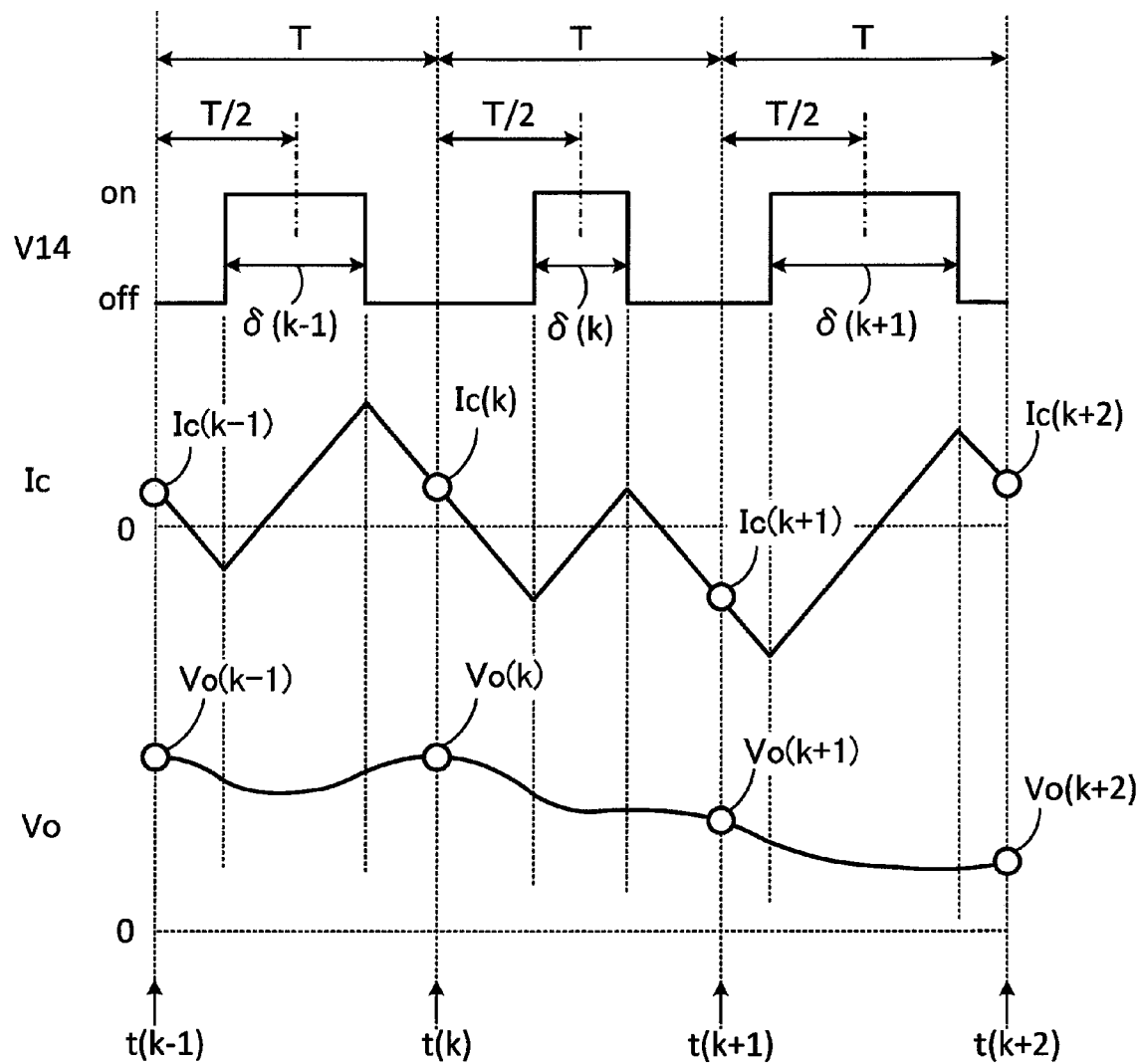
FIG. 3 is a timing diagram illustrating the steady-state operation of the first embodiment of the present invention.

Hereinafter, an operation of the switching power supply device 10 will be described. Here, it is assumed that the time required for various calculation processes and the like performed in the control circuit 24 is sufficiently short and thus can be ignored. FIGS. 2 and 3 each illustrate that the switching power supply device 10 is performing a steady-state operation after input is placed therein. A cycle in which the calculation means 28 samples each signal is T, which is the same as the switching cycle. The calculation means 28 samples at timings t(k−1), t(k), t(k+1) and t(k+2) for each sampling cycle T.

In the switching power supply device 10, even during the steady-state operation, the ON and OFF time of the main switching element 14 change slightly for each switching cycle due to influences of relatively small disturbances (e.g., a change in the ambient temperature). Such a slight change is exaggerated in FIG. 3 for the sake of convenience of illustration of the steady-state operation.

First, as illustrated in FIG. 2, the calculation means 28 obtains, at timing t(k), a time ratio δ(k−1) which the calculation means 28 determined before t(k) and also obtains Vi(k−1) and Vo(k−1) which the calculation means 28 sampled before t(k) (step S11). At the same timing t(k), the calculation means 28 samples an input voltage signal Vi(k) and an output voltage signal Vo(k) (step S12). Then the calculation means 28 performs a predetermined calculation process on the basis of the sampled signals Vi(k) and Vo(k), the past time ratio δ(k−1), the past input voltage signals Vi(k−1) and the past output voltage signal Vo(k−1), and calculates the next time ratio δ(k) of the main switching element 14 (step S13). The time ratio δ(k) is defined by Formula (7).

[Formula 7]

$$\delta(k) = \frac{ton(k)}{T} = \frac{T - toff(k)}{T} \quad (7)$$

In Formula (7), T represents a switching cycle and ton(k) and toff(k) each represents ON and OFF time of the main switching element 14.

Hereinafter, details of the calculation process in the calculation means 28 to obtain the time ratio δ(k) will be described. Since the slope of the capacitor current Ic which flows in the smoothing capacitor 20 is proportional to the reciprocal of the inductance L of the smoothing inductor 18, a capacitor current Ic(k+1) at the next sampling timing t(k+1) can be expressed by Formula (8) using each signal sampled at the timing t(k), and ton(k) and toff(k):

[Formula 8]

$$Ic(k+1) = Ic(k) + \frac{Vi(k) - Vo(k)}{L} \cdot ton(k) - \frac{Vo(k)}{L} \cdot toff(k) \quad (8)$$

By substituting the ON time ton(k) and the OFF time toff(k) in Formula (8) by the switching cycle T and the time ratio δ(k), Formula (9) is obtained. Similarly, Formula (10) is obtained.

[Formula 9]

$$Ic(k+1) - Ic(k) = \frac{T}{L} \cdot Vi(k) \cdot \delta(k) - \frac{T}{L} \cdot Vo(k) \quad (9)$$

[Formula 10]

$$Ic(k) - Ic(k-1) = \frac{T}{L} \cdot Vi(k-1) \cdot \delta(k-1) - \frac{T}{L} \cdot Vo(k-1) \quad (10)$$

Further, an output voltage Vo(k+1) at the next sampling timing t(k+1) can be expressed by Formula (11), and Formula (12) is obtained similarly.

[Formula 11]

$$C \cdot Vo(k+1) - C \cdot Vo(k) = \frac{T}{2}[Ic(k+1) + Ic(k)] \quad (11)$$

[Formula 12]

$$C \cdot Vo(k) - C \cdot Vo(k-1) = \frac{T}{2}[Ic(k) + Ic(k-1)] \quad (12)$$

When the capacitor currents Ic(k+1), Ic(k) and Ic(k−1) are deleted from Formulae (9) to (12), Formula (13) is obtained. Similarly, when the capacitor currents Ic(k), Ic(k−1) and Vo(k+1) are deleted from Formulae (9) to (12), Formula (14) is obtained.

[Formula 13]

$$Vo(k+1) = a1 \cdot Vo(k) + a2 \cdot Vo(k-1) + b1 \cdot u(k) + b2 \cdot u(k-1) \quad (13)$$

[Formula 14]

$$\frac{T}{C} \cdot Ic(k+1) = \quad (14)$$
$$(a1 + a2) \cdot Vo(k) + a2 \cdot Vo(k-1) + 2 \cdot b1 \cdot u(k) + b2 \cdot u(k-1)$$

In Formulae (13) and (14), u(k) and u(k−1) are composite signals defined as expressed in Formula (15), a1, a2, b1 and b2 are composite constants constituted by a combination of multiple circuit constants of the switching cycle T, the inductance L and the capacitance C and are defined by Formulae (16) to (18), respectively.

[Formula 15]

$$u(k) = Vi(k) \cdot \delta(k), \quad u(k-1) = Vi(k-1) \cdot \delta(k-1) \quad (15)$$

[Formula 16]

$$a1 = 2 - \frac{T^2}{2 \cdot L \cdot C} \quad (16)$$

[Formula 17]

$$a2 = -1 - \frac{T^2}{2 \cdot L \cdot C} \quad (17)$$

[Formula 18]

$$b1 = b2 = \frac{T^2}{2 \cdot L \cdot C} \quad (18)$$

The calculation means 28 determines the time ratio δ(k) such that the output voltage Vo to be detected at the next sampling timing t(k+1) and the output differential value Vd at that time satisfy the relationship defined by Formula (6). If a concept of sampling timing is included in the control function formula of Formula (6) and the output differential value Vd is expressed by the capacitor current Ic and the capacitance C, Formula (19) can be developed.

[Formula 19]

$$Ic(k+1) = -\frac{C}{\tau}[Vo(k+1) - Vref] \quad (19)$$

By substituting Formulae (13) and (14) into Formula (19), the capacitor current Ic(k+1) and the output voltage Vo(k+1)

are deleted and Formula is arranged, Formula (20) for calculating the time ratio δ(k) is obtained.

[Formula 20]

$$\delta(k) = \frac{1}{(2-s) \cdot b1 \cdot Vi(k)} \begin{bmatrix} \{(s-1) \cdot a1 - a2\}Vo(k) + \\ (s-1) \cdot a2 \cdot Vo(k-1) + \\ (s-1) \cdot b2 \cdot u(k-1) - s \cdot Vref \end{bmatrix} \quad (20)$$

In Formula (20), s represents (−T/τ). According to Formula (20), information necessary to calculate δ(k) except for the circuit constant and the like set by default is the input voltage Vi(k), the output voltage Vo(k), Vo(k−1) and the composite signal u(k−1) which is a product of the input voltage signal Vi(k−1) and the time ratio δ(k−1). Each of the above information is known when the sampling timing t(k) has passed, and it is understood that the time ratio δ(k) can be calculated on the basis of Formula (20).

As described above, the calculation means 28 calculates, in step S13, the time ratio δ(k) until the next sampling timing t(k+1) by substituting the signals and the like obtained in steps S11 and S12 into Formula (20).

Next, the drive pulse generating means 30 generates the drive pulse V14 for the main switching element 14 and the drive pulse V16 for the rectifying element 16 on the basis of the time ratio δ(k) determined in step S13 (step S14). In the drive pulse V14, the same period is set before and after a midpoint of the sampling cycle T in the time ratio δ(k) and, in that period, the drive pulse V14 indicates a high level during which the main switching element 14 is turned ON. The drive pulse V16 is a pulse voltage having the opposite phase with the drive pulse V14 and, in that period of time ratio δ(k), indicates a low level during which the rectifying element 16 is turned OFF.

PWM control is performed on the switching power supply device 10 by repeating steps S11 to S14 such that the output voltage becomes equal to the target value Vref.

Next, a transient operation of the switching power supply device 10 will be described. Here, an ON-time maximum time ratio δmax and an ON-time minimum time ratio δmin are set in the drive pulse V14 which can be generated by the drive pulse generating means 30. It is considered that the maximum time ratio δmax is set in a range narrower than 100%, e.g., about 60 to 95%, in order to improve safety of the power converter circuit or let functional blocks properly function in synchronization.

Figure 4:
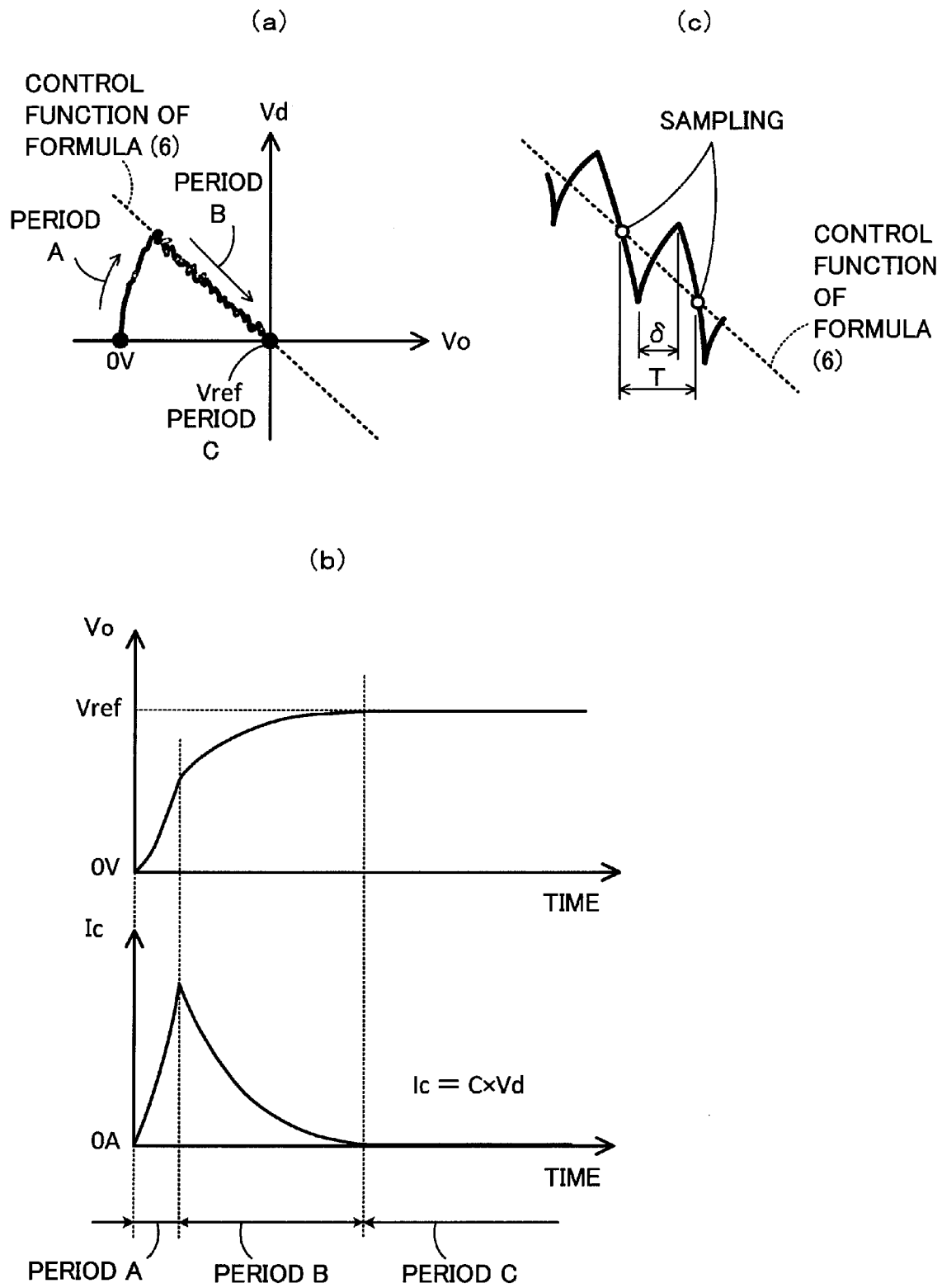
FIG. 4(a) is a graph of a control function formula illustrating an operation of the first embodiment of the present invention when an input voltage is placed.
FIG. 4(b) is a timing diagram of a control function formula illustrating an operation of the first embodiment of the present invention when an input voltage is placed.
FIG. 4(c) is a graph illustrating an operation in period B.

A transient operation after the input DC power supply 12 is placed in the switching power supply device 10 which is not in operation and until the output voltage reaches the target value Vref is illustrated in FIG. 4. FIG. 4(a) is a graph in which the output voltage signal Vo is plotted in the horizontal axis and the output differential value Vd is plotted in the vertical axis. A dashed line represents the control function formula of Formula (6). When the switching power supply device 10 is not in operation, the output voltage signal Vo is zero. When input is placed, the output voltage starts increasing, the output voltage signal Vo and the output differential value Vd change along a locus represented by a solid line, and the output voltage signal Vo reaches the target value Vref and becomes stable.

Since a difference between the output voltage signal Vo and the target value Vref is large during a period A which is the period immediately after placement of the input as illustrated in FIG. 4(b), the time ratio δ(k) calculated using Formula (20) unfavorably exceeds the ON-time maximum time ratio δmax.

If the time ratio δ(k) calculated by the calculation means 28 is greater than the maximum time ratio δmax, the drive pulse generating means 30 uniformly outputs the drive pulse V14 of the maximum time ratio δmax. Therefore, during the period A, the output voltage increases rapidly with an extremely large controlled variable of the maximum time ratio δmax.

during a period B, the difference between the output voltage signal Vo and the target value Vref becomes relatively small and the time ratio δ(k) calculated using Formula (20) decreases below the maximum time ratio δmax. Then, the drive pulse generating means 30 outputs the drive pulse V14 of the time ratio δ(k) and drives the main switching element 14. Thus, the relationship between the output voltage signal Vo and the output differential value Vd changes along the dashed line of the graph (that is, while satisfying the relationship of Formula (6)). Specifically, an operation illustrated in FIG. 4(c) is performed in each switching cycle T. Since Formula (6) is a control function formula representing the control of "first order lag," the output voltage signal Vo rises along a curve of an exponential function in which a constant τ is set to a time constant, as illustrated in FIG. 4(b). Then, during a period C, there is no difference between the output voltage signal Vo and the target value Vref and the switching power supply device 10 performs the steady-state operation illustrated in FIGS. 2 and 3.

A transient operation at the time of a sudden change in the input or in the load is basically the same as operations at the time of the above-described placement of the input. For example, if the input voltage increases rapidly or the load is reduced rapidly during the steady-state operation, the output voltage increases and, as a result, the output voltage signal Vo and the output differential value Vd temporarily do not satisfy the relationship defined by Formula (6). If the output voltage signal Vo increases and the difference between the output voltage signal Vo and the target value Vref becomes large, the time ratio δ(k) calculated using Formula (20) decreases below the ON-time minimum time ratio δmin (e.g., a negative value). The drive pulse generating means 30 uniformly outputs the drive pulse V14 of the minimum time ratio δmin (e.g., 0%) when the calculated time ratio δ(k) is smaller than the minimum time ratio δmin Therefore, the switching power supply device 10 tries to decrease the output voltage rapidly during, for example, a period immediately after the rapid increase of the input voltage by operating uniformly at the minimum time ratio min and minimizing the power supply from the input side.

Then, as the difference between the output voltage signal Vo and the target value Vref becomes relatively small, and the time ratio δ(k) calculated using Formula (20) becomes equal to or greater than the ON-time minimum time ratio δmin, the drive pulse generating means 30 outputs the drive pulse V14 of the time ratio δ(k) and drives the main switching element 14. Then, as the output voltage signal Vo and the output differential value Vd change along the dashed line of the graph and the difference between the output voltage signal Vo and the target value Vref is eliminated, the switching power supply device 10 performs the steady-state operation illustrated in FIGS. 2 and 3.

In the switching power supply device 10, as described above, Formula (6) which is a control function formula is defined in the calculation means 28 of the control circuit 24, and the switching power supply device 10 includes, as variables, the output voltage and the output differential value which represents a change in the output voltage and prescribes a predetermined relationship via the target value Vref of the output voltage. Then the calculation means 28 samples the input voltage signal Vi and the output voltage signal Vo and calculates the time ratio δ for determining the ON and OFF time using Formula (20) developed to satisfy Formula (6). Therefore, an operation delay due to differential calculation with a great number of times of calculation is eliminated and, high speed response characteristics can be implemented with a simple and inexpensive control circuit. Further, when the input voltage or the output voltage change suddenly, the information regarding the sudden change is immediately reflected in the calculation process and, therefore, a response to the sudden change in the input voltage or in the load is rapidly made. When the time ratio δ calculated by Formula (20) is not in the range between the minimum time ratio δmin and the maximum time ratio δmax, an ON-time ratio of the main switching element is uniformly set to the minimum time ratio δmin or the maximum time ratio δmax and the controlled variable for reducing a deviation between the output voltage and the target value becomes the maximum instantaneously.

Further, since the time ratio δ(k) calculated by the calculation means 28 changes such that the output voltage signal Vo and the output differential value Vd satisfy the linear relationship of Formula (6), no overshoot or vibration occurs in the output voltage in the process until the output voltage reaches the predetermined target value Vref and the steady-state operation is started (e.g., the periods A and B in FIG. 4).

A way of change in, for example, the output voltage when the input is placed can be adjusted easily by changing the control function formula of Formula (6). For example, if the coefficient τ in Formula (6) is changed significantly, the slope of the dashed line of FIG. 4(a) becomes less steep and the period A is terminated in a shorter time. Therefore, a peak value of the capacitor current (which corresponds to Ic) becomes small and the stress to electronic components is reduced. At the same time, the rate of increase in the output voltage is lowered and the period B is prolonged. Thus, the starting time of the switching power supply device 10 becomes long.

It is also possible to add conditions to Formula (6) such that the output differential value Vd becomes a constant value Vdd in a range in which the difference between the output voltage signal Vo and the target value Vref exceeds ε. In that case, control function formulae are expressed by Formulae (21) to (23).

[Formula 21]
$$Vd = +Vdd = \frac{\varepsilon}{\tau}[Vo \leq Vref - \varepsilon] \quad (21)$$

[Formula 22]
$$Vd = -\frac{1}{\tau}(Vo - Vref)[Vref - \varepsilon \leq Vo \leq Vref + \varepsilon] \quad (22)$$

[Formula 23]
$$Vd = -Vdd = -\frac{\varepsilon}{\tau}[Vo \geq Vref + \varepsilon] \quad (23)$$

Figure 5:
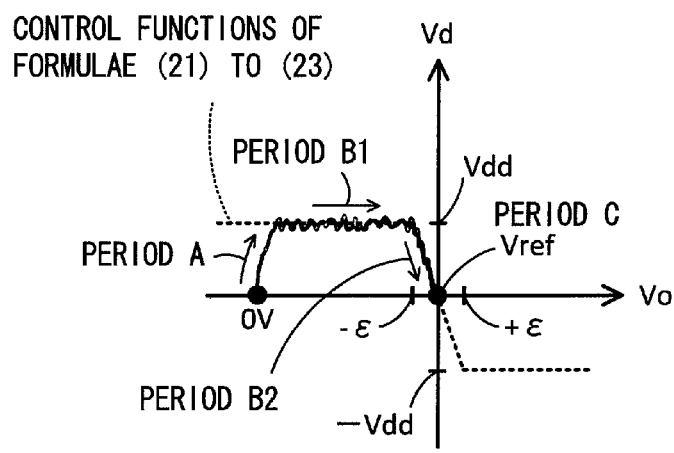
FIG. 5(a) is a graph of a variant of the control function formula of FIG. 4(a)
FIG. 5(b) is a timing diagram illustrating an operation in the variant.
Figure 5:
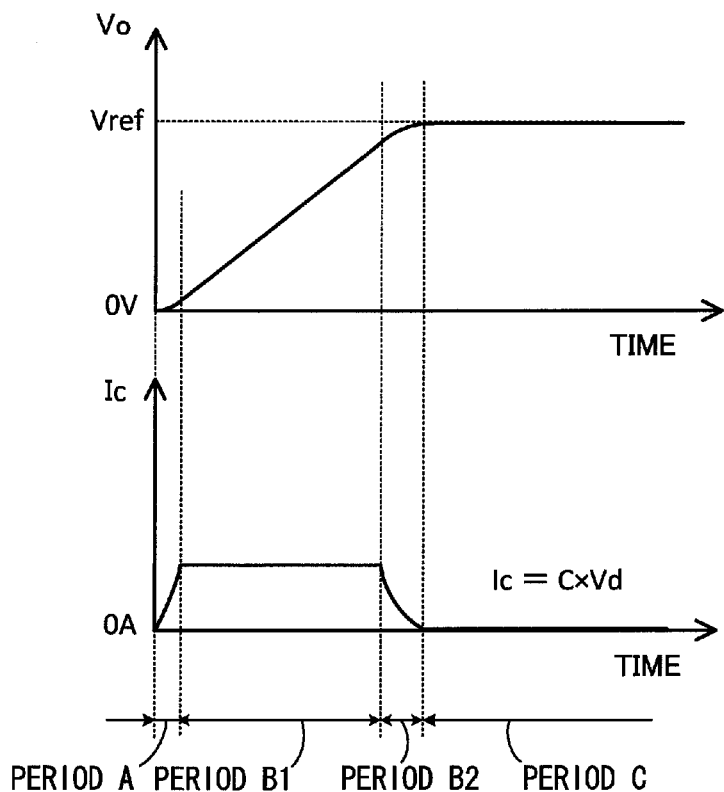

When these control function formulae of Formulae (21) to (23) are defined in the calculation means 28, three calculation formulae of the time ratio δ(k) corresponding to Formula (20) described above are available. These calculation formulae are used depending on the value of the output voltage signal Vo. During the period A immediately after the input is placed, as illustrated in FIG. 5, since the time ratio δ(k) obtained by one corresponding calculation formula exceeds the ON-time maximum time ratio δmax the drive pulse V14 of the maximum time ratio δmax is uniformly output. The relationship between the output voltage signal Vo and the output differential value Vd reaches the dashed line which represents Formulae (21) to (23) in a short time and a period B1 begins. Therefore, the peak value of the capacitor current (which corresponds Ic) can be limited to a relatively small value.

during the periods B1 and B2, a calculation formula corresponding to each period is selected and the time ratio δ(k) is calculated from the selected calculation formula. Since the obtained time ratio δ(k) is a value equal to or smaller than the maximum time ratio δmax, the drive pulse generating means 30 outputs the drive pulse V14 of the time ratio δ(k) and drives the main switching element 14. Thus, the relationship between the output voltage signal Vo and the output differential value Vd changes along the dashed line of the graph. Then, during the period C, a difference between the output voltage signal Vo and the target value Vref is eliminated and the steady-state operation illustrated in FIGS. 2 and 3 is started.

Here, by adjusting the coefficient τ in Formula (22), the length of the periods B1 and B2 can be shortened while lowering the peak value of the capacitor current. For example, it is also possible to set the periods B1 and B2 to be equivalent to the period B in FIG. 4 by setting the coefficient τ as a small value. That is, by applying Formulae (21) to (23) instead of Formula (6) as the control function formulae, the starting time of the switching power supply device 10 and the peak value of the capacitor current can be adjusted independently.

Figure 6:
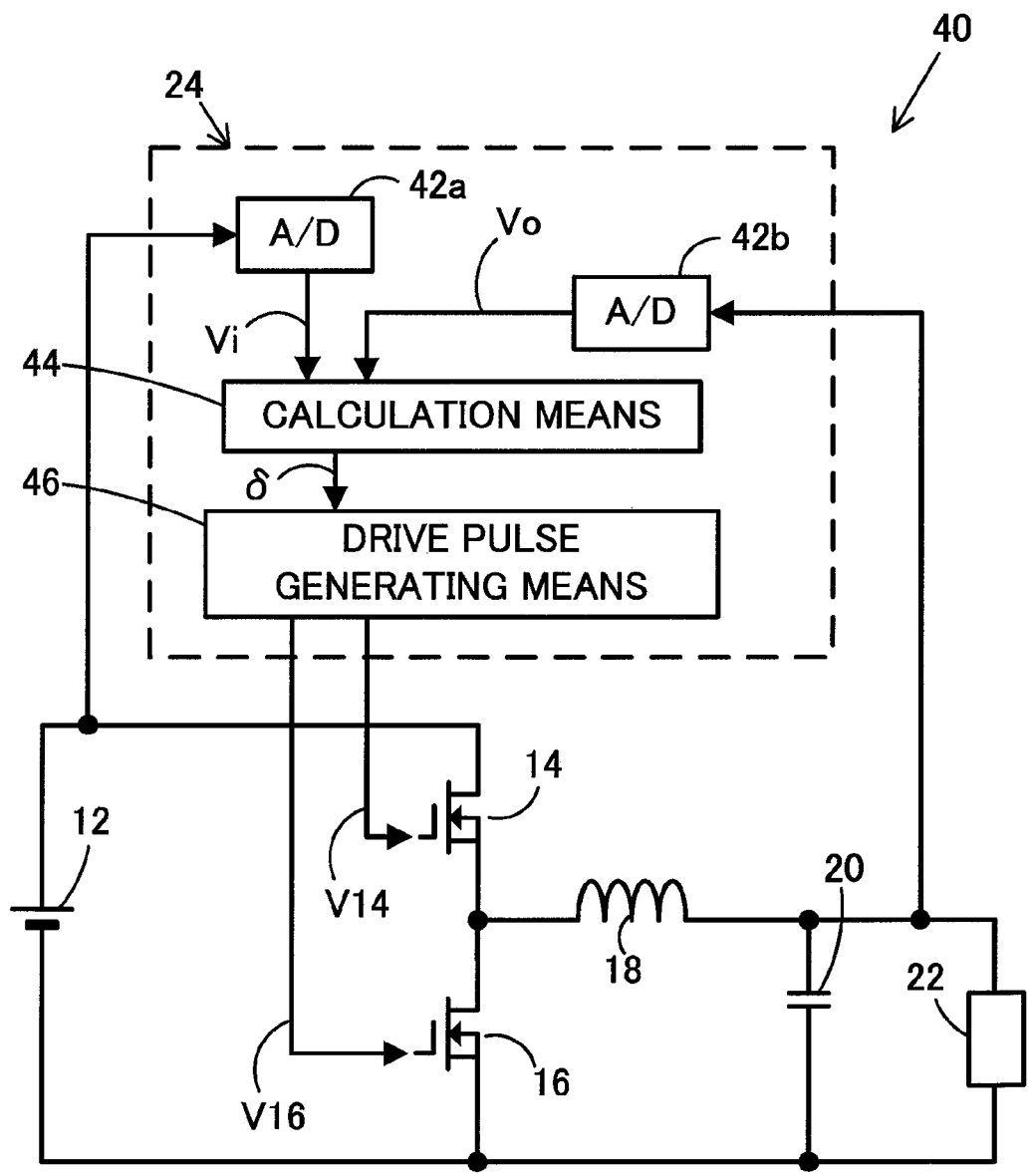
FIG. 6 is a circuit diagram of a second embodiment of a switching power supply device of the present invention.
Figure 7:
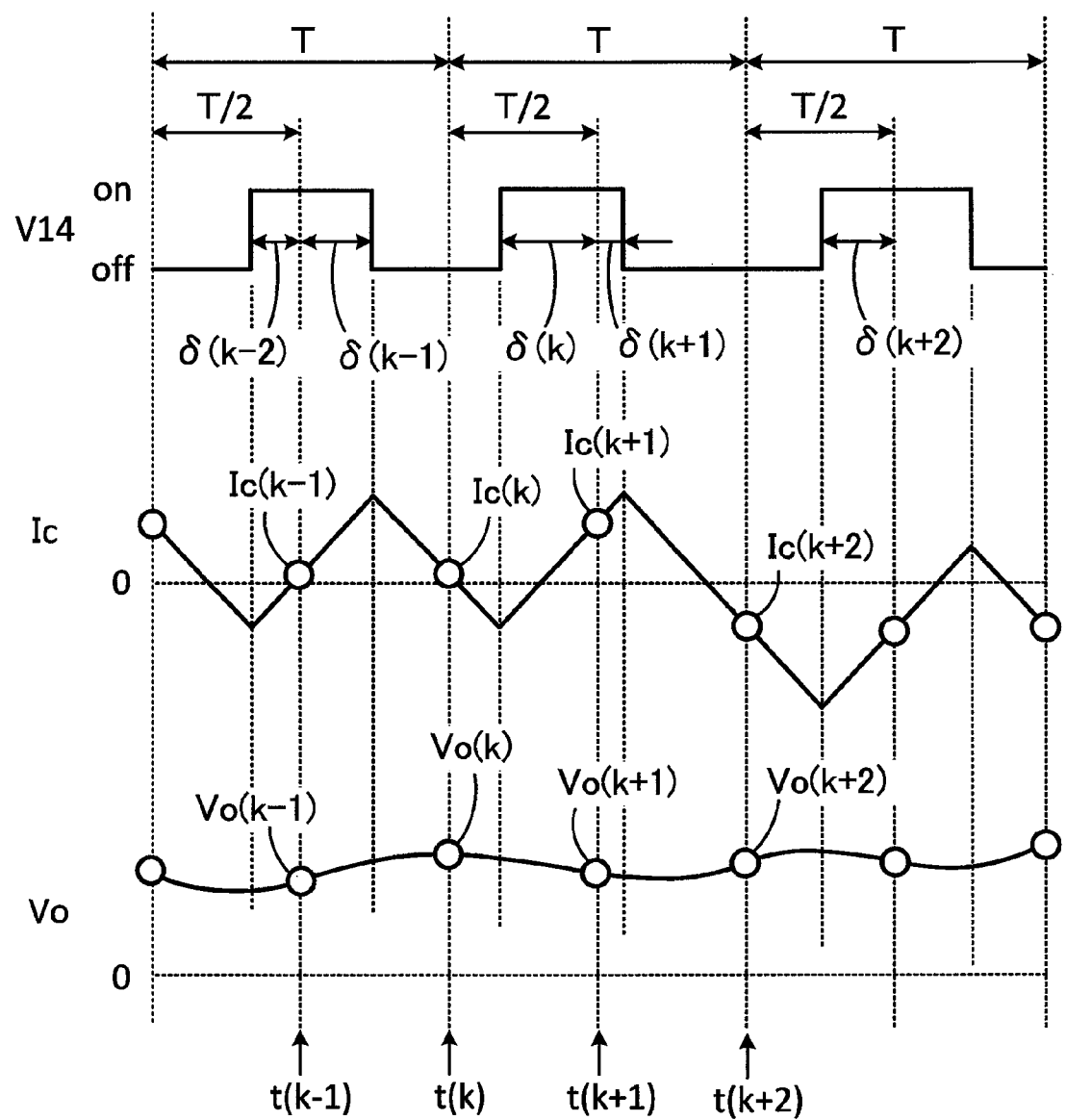
FIG. 7 is a timing diagram illustrating a steady-state operation of the second embodiment of the present invention.

Next, a switching power supply device 40 of a second embodiment of the present invention will be described with reference to FIGS. 6 and 7. Here, components similar to those of the above-described switching power supply device 10 will be denoted by similar reference numerals and description thereof will be omitted. The switching power supply device 40 has a configuration substantially similar to that of the switching power supply device 10 illustrated in FIG. 1 except that A/D converters 42a and 42b, a calculation means 44 and a drive pulse generating means 46 are provided instead of the A/D converters 26a and 26b, the calculation means 28 and the drive pulse generating means 30. The A/D converters 42a and 42b, the calculation means 44 and the drive pulse generating means 46 behave differently from the A/D converters 26a and 26b, the calculation means 28 and the drive pulse generating means 30, respectively.

Analog information from each component is input in the A/D converters 42a and 42b, which sample the information at predetermined timings and output an input voltage signal Vi and an output voltage signal Vo which have been converted into digital information. The sampling is performed every half cycle of the switching cycle of a main switching element 14. The sampling is performed at arbitrary timings during the ON time of the main switching element 14 and during a period during which a smoothing inductor 18 is releasing, to an output side, excitation energy accumulated during the ON time. Here, the state of "releasing excitation energy to the output side" also includes a state in which a current which releases the excitation energy is flowing from the output side toward the smoothing inductor 18.

The control function formula of Formula (6) is defined in the calculation means 44 as in the above-described calculation means 28. However, unlike the calculation means 28, the calculation means 44 samples, from the above-described A/D converters 42a and 42b, the input voltage signal Vi and the output voltage signal Vo at predetermined timings of every half cycle of the switching cycle described above. The calculation means 44 then performs a predetermined calculation similar to Formula (20) on the basis of these two signals and the like to obtain a time ratio δ of the period until the next sampling timing.

The drive pulse generating means 46 generates a drive pulse V14 for the main switching element 14 and a drive pulse V16 for the rectifying element 16 on the basis of the time ratio δ determined by the calculation means 44. However, unlike the drive pulse V14 generated by the drive pulse generating means 30, the drive pulse V14 generated by the drive pulse generating means 46 is a pulse voltage of which periods before and after a second sampling timing in one switching cycle T are defined as the ON period of the main switching element 14. The drive pulse V14 indicates a high level during the period of the time ratio δ during which the main switching element 14 is turned ON and indicates a low level during other periods. The drive pulse V16 is a pulse voltage synchronized with and having the opposite phase with the drive pulse V14. The drive pulse V16 indicates a low level during the period of the time ratio δ and indicates a high level during other periods during which the rectifying element 16 is turned ON.

In the case of the calculation means 44 and the drive pulse generating means 46, when sampling is performed during a period during which no current is flowing through the smoothing inductor 18 (i.e., a zero current period), control of the output using the output differential value Vd on the basis of Formula (6) becomes impossible. However, as in the switching power supply device 10, since bidirectionally conductive N-channel MOSFETs are used as the main switching element 14 and the rectifying element 16 in the switching power supply device 40, even if, for example, the output current supplied to the load 22 is reduced to a critical point or below the critical point, the smoothing inductor 18 continues flowing the current and thus no zero current period occurs. Therefore, sampling can be performed at arbitrary timings in the switching cycle T.

Hereinafter, an operation of the switching power supply device 40 will be described. A flowchart which illustrates a steady-state operation after input is placed is the same as that of FIG. 2 described with reference to the above-described switching power supply device 10. Thus, as illustrated in a timing diagram of FIG. 7, the time ratio δ is variably adjusted every half cycle of the switching cycle T. Therefore, since the time ratio δ is adjusted twice as often as in the above-described switching power supply device 10 and the control delay in the output voltage is reduced by half, the response of the control is even more accelerated. Further, the transient operation of the switching power supply device 40, such as placement of the input, a sudden change in the input and a sudden change in the load, is also substantially the same as the operation of the above-described switching power supply device 10 and thus no transient overshoot or vibration occurs when the output voltage changes.

Figure 8:
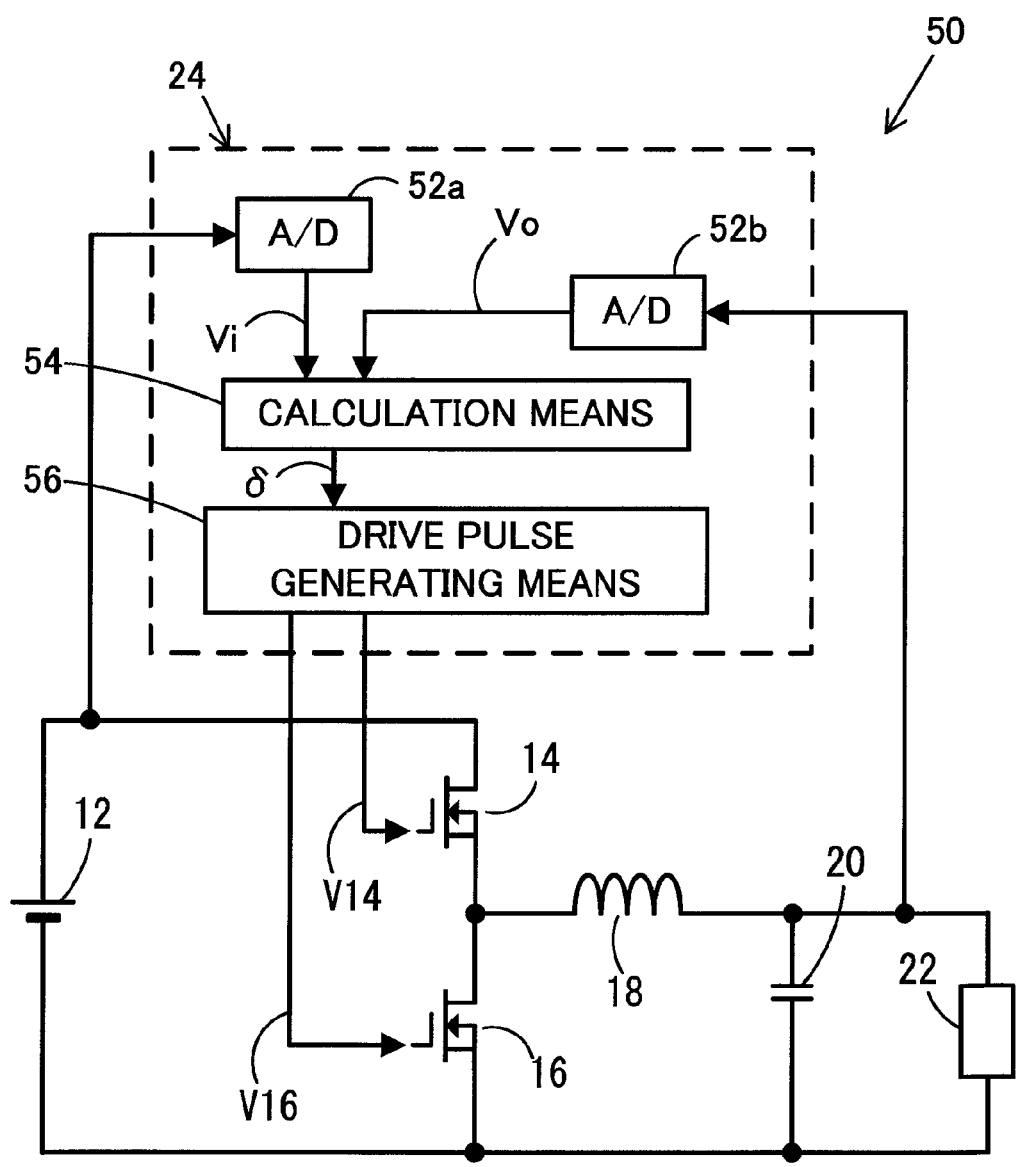
FIG. 8 is a circuit diagram of a third embodiment of a switching power supply device of the present invention.

Next, a switching power supply device 50 of a third embodiment of the present invention will be described with reference to FIGS. 8 to 10. Here, components similar to those of the above-described switching power supply device 10 will be denoted by similar reference numerals and description thereof will be omitted. The switching power supply device 50 has a configuration substantially similar to that of the switching power supply device 10 illustrated in FIG. 1 except that A/D converters 52a and 52b, a calculation means 54 and a drive pulse generating means 56, which behave differently, are provided instead of the A/D converters 26a and 26b, the calculation means 28 and the drive pulse generating means 30. The A/D converters 52a and 52b, the calculation means 54 and the drive pulse generating means 56 behave differently from the A/D converters 26a and 26b, the calculation means 28 and the drive pulse generating means 30, respectively.

Analog information from each component is input in the A/D converters 52a and 52b, which sample the information at predetermined timings and output an input voltage signal Vi and an output voltage signal Vo which have been converted into digital information. The sampling is performed for each switching cycle of a main switching element 14. The sampling is performed at timings at which the main switching element 14 is turned from OFF to ON.

The control function formula of Formula (6) is defined in the calculation means 54 as in the above-described calculation means 28. However, unlike the calculation means 28, the calculation means 54 samples, from the above-described A/D converters 52a and 52b, the input voltage signal Vi and the output voltage signal Vo at the timings at which the main switching element 14 is turned ON for each switching cycle described above. Then, a predetermined operation is performed on the basis of these two signals and the like and a time ratio δ is obtained.

Since a control circuit 24 of the switching power supply device 50 is constituted by a relatively inexpensive and general-purpose digital IC, the time required for the calculation process and the like performed by the calculation means 54 is not ignorable. Therefore, the calculation means 54 calculates the time ratio δ during a period after the next sampling timing while the above-described calculation means 28 which is constituted by, for example, a digital IC that is capable of a high speed calculation calculates the time ratio δ during the period until the next sampling timing. Here, the ON-time ratio δ is calculated under conditions that the total of the ON and OFF time is kept constant and that certain PWM control is performed such that the switching cycle becomes constant.

The drive pulse generating means 56 generates a drive pulse V14 for the main switching element 14 and a drive pulse V16 for the rectifying element 16 on the basis of the time ratio δ determined by the calculation means 54. However, unlike the drive pulse V14 generated by the drive pulse generating means 30, the drive pulse V14 generated by the drive pulse generating means 46 is a pulse voltage of which a period of the time ratio δ starting at the sampling timing is defined as the ON period of the main switching element 14. During the period of the time ratio δ, the drive pulse V14 indicates a high level during which the main switching element 14 is turned ON and indicates a low level during other periods. The drive pulse V16 is a pulse voltage synchronized with and having the opposite phase with the drive pulse V14. The drive pulse V16 indicates a low level during a period of the time ratio δ and indicates a high level during other periods during which the rectifying element 16 is turned ON.

Hereinafter, an operation of the switching power supply device 50 will be described. FIG. 10 illustrates that the switching power supply device 50 is performing a steady-state operation after input is placed. The cycle in which the calculation means 54 samples each signal is T, which is the same as the switching cycle, and the sampling is performed at timings of t(k−1), t(k), t(k+1) and t(k+2) for each sampling cycle T at which the main switching element 14 is turned from OFF to ON.

Figure 9:
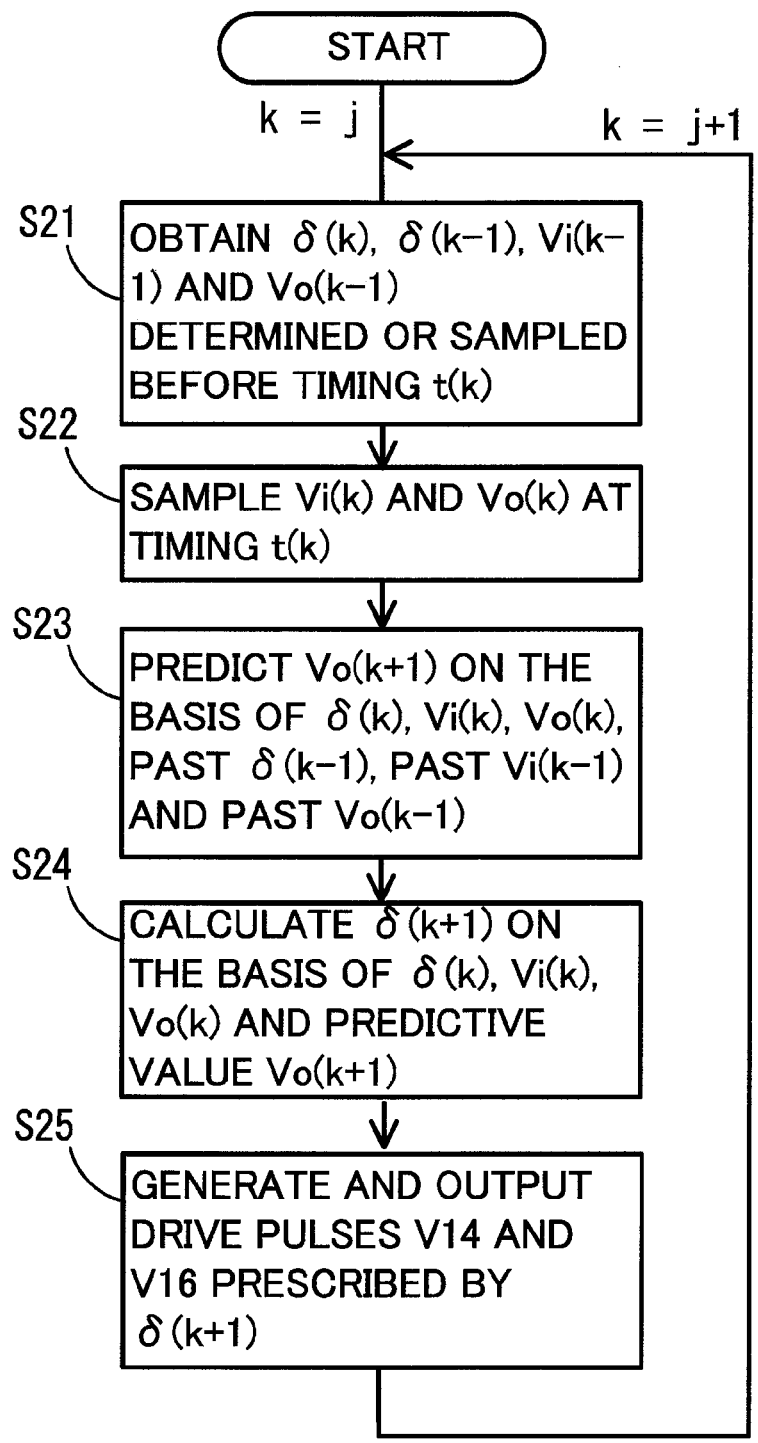
FIG. 9 is a flowchart illustrating a steady-state operation of the third embodiment of the present invention.

First, as illustrated in FIG. 9, the calculation means 54 obtains, at timing t(k), time ratios δ(k) and δ(k−1) which the calculation means 54 determined before t(k) and also obtains Vi(k−1) and Vo(k−1) which the calculation means 54 sampled before t(k) (step S21). At the same timing t(k), the calculation means 54 samples an input voltage signal Vi(k) and an output voltage signal Vo(k) (step S22). Then, by substituting the time ratio δ(k), the input voltage signal Vi(k), the output voltage signal Vo(k), the past time ratio δ(k−1), the past input voltage signal Vi(k−1) and the past output voltage signal Vo(k−1) into Formula (13) described above, Vo1 (k+1) which is a predicted value of the output voltage signal of the timing t(k+1) is calculated (Step S23). Then, by substituting the time ratio δ(k), the input voltage signal Vi(k), the output voltage signal Vo(k) and the predicted value Vo1 (k+1) into the next Formula (24), the time ratio δ(k+1) after the next sampling timing t(k+1) is calculated (step 24).

[Formula 24]

$$\delta(k+1) = \frac{1}{(2-s) \cdot b1 \cdot Vi(k)} \cdot \begin{bmatrix} \{(s-1) \cdot a1 - a2\} \cdot Vo(k+1) + \\ (s-1) \cdot a2 \cdot Vo(k) + \\ (s-1) \cdot b2 \cdot u(k) - s \cdot Vref \end{bmatrix} \quad (24)$$

In Formula (24), k in Formula (20) is represented by k+1 and k−1 is represented by k. Vi(k) included in the denominator of the right side of Formula (24) should be Vi(k+1), but since the input voltage signal Vi(k+1) is not known at the timing immediately after t(k), known Vi(k) is used instead.

In this manner, the calculation means 54 calculates the time ratio δ(k+1) after the timing t(k+1) such that the relationship between the output voltage signal Vo and the output differential value Vd at the sampling timing t(k+2) satisfies Formula (6). In the case of the switching power supply device 50, since sampling is performed at the timing at which the main switching element 14 is turned from OFF to ON, an amplitude component of the capacitor current Ic for each switching cycle may be a cause of deviation of the output voltage setting. Therefore, it is desirable to deform Formula (24) in consideration of the point described above.

Next, the drive pulse generating means 56 generates the drive pulse V14 and the drive pulse V16 after the timing t(k+1) on the basis of the time ratio δ(k+1) determined in step S24 (step S25). Since the drive pulse V14 is set such that the period of the time ratio δ(k+1) starts at the timing t(k+1), during that period, the drive pulse V14 indicates a high level during which the main switching element 14 is turned ON. The drive pulse V16 is a pulse voltage having the opposite phase with the drive pulse V14 and, in that period of time ratio δ(k), indicates a low level during which the rectifying element 16 is turned OFF.

Figure 10:
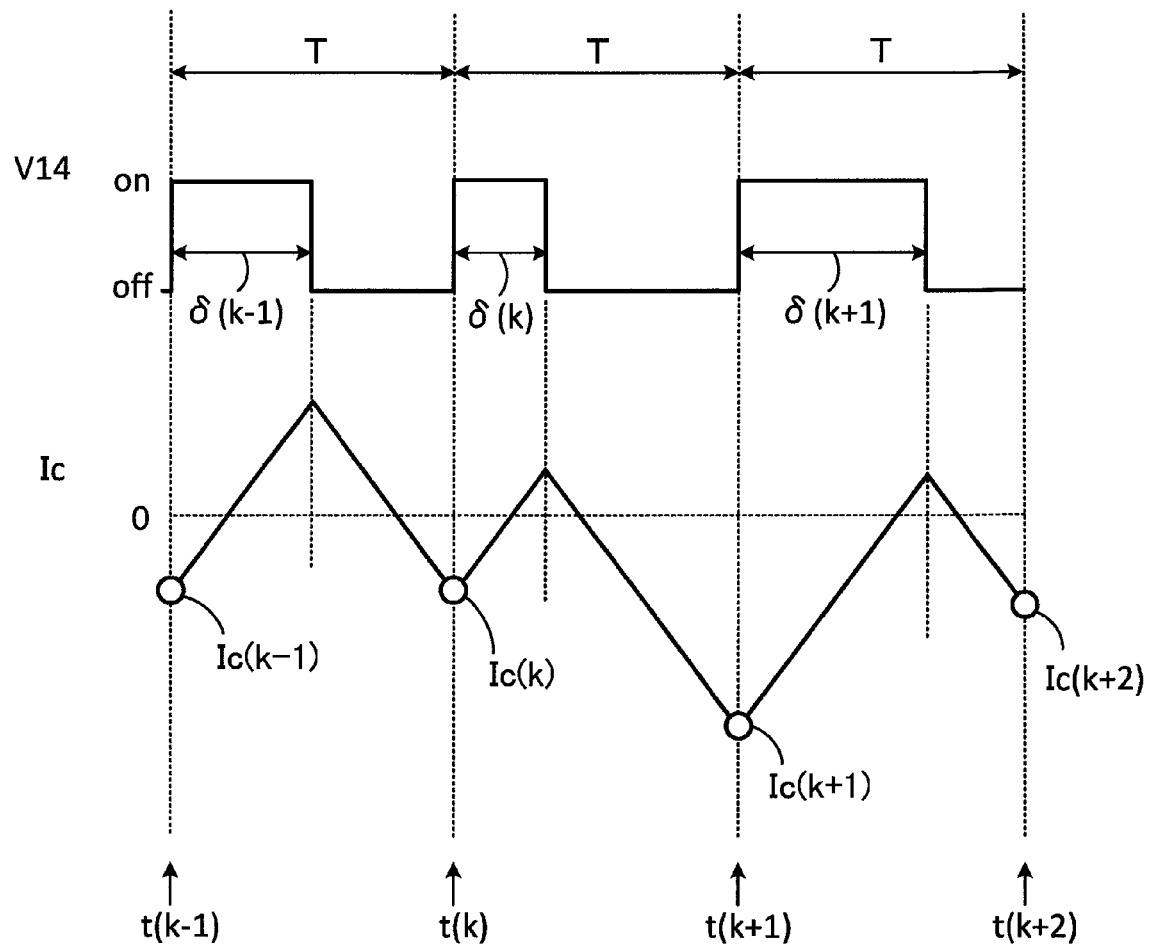
FIG. 10 is a timing diagram illustrating the steady-state operation of the third embodiment of the present invention.

The switching power supply device 50 performs the operation illustrated in FIG. 10 by repeating steps S21 to S25 and is subject to PWM control such that the output voltage becomes equal to the target value Vref. Since the calculation means 54 calculates the time ratio δ after the next sampling timing, there is a time-lag by one switching cycle during the control operation of the calculation means 54 as compared with the above-described switching power supply device 10. However, sufficiently practical response speed is ensured. Further, the transient operation of the switching power supply device 50, such as placement of the input, a sudden change in the input and a sudden change in the load, is also substantially the same as the operation of the above-described switching power supply device 10 and thus no transient overshoot or vibration occurs when the output voltage changes. Thus, the switching power supply device 50 can constitute the control circuit 24 with excellent control property even using a relatively inexpensive medium or low speed digital IC.

Figure 11:
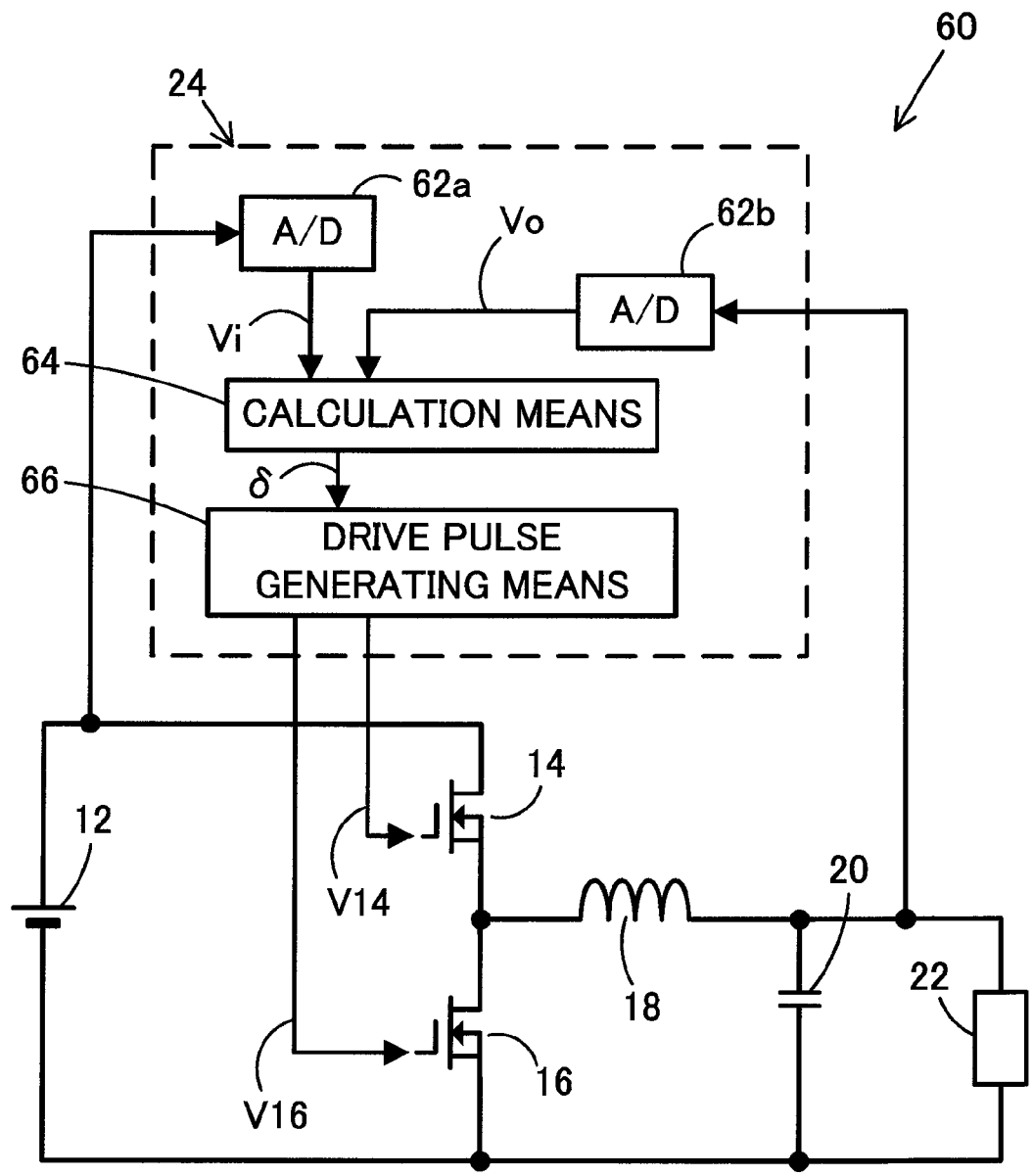
FIG. 11 is a circuit diagram of a fourth embodiment of a switching power supply device of the present invention.

Next, a switching power supply device 60 of a fourth embodiment of the present invention will be described with reference to FIGS. 11 to 13. Here, components similar to those of the above-described switching power supply device 10 will be denoted by similar reference numerals and description thereof will be omitted. The switching power supply device 60 has a configuration substantially similar to that of the switching power supply device 10 illustrated in FIG. 1 except that A/D converters 62a and 62b, a calculation means 64 and a drive pulse generating means 66, which behave differently, are provided instead of the A/D converters 26a and 26b, the calculation means 28 and the drive pulse generating means 30. The A/D converters 62a and 62b, the calculation means 64 and the drive pulse generating means 66 behave differently from the A/D converters 26a and 26b, the calculation means 28 and the drive pulse generating means 30, respectively.

Analog information from each component is input in the A/D converters 62a and 62b, which sample the information at predetermined timings and output an input voltage signal Vi and an output voltage signal Vo which have been converted into digital information. The sampling is performed for each switching cycle of a main switching element 14. The sampling is performed at timings in synchronization with the switching cycle of the main switching element 14, i.e., at predetermined timings during the ON time of the main switching element 14 or during a period during which a smoothing inductor 18 is releasing excitation energy. However, the switching cycle determined by the calculation means 64 varies as described later.

The control function formula of Formula (6) is defined in the calculation means 64 as in the above-described calculation means 28. Then, the input voltage signal Vi and the output voltage signal Vo are sampled from the A/D converters 62a and 62b at the above-described sampling timings. Then, the calculation means 64 performs predetermined calculation processes on the basis of these two signals and the like and calculates the ON and OFF time.

Since a control circuit 24 of the switching power supply device 60 is constituted by a relatively inexpensive and general-purpose digital IC, the time required for the calculation process and the like performed by the calculation means 64 is not ignorable. Therefore, here, the ON time and the OFF time of the main switching element 14 after the next sampling timing are calculated. Further, here, the OFF time is calculated such that PFM control is performed while the ON time becomes constant. Therefore, the switching cycle and the sampling cycle vary.

The drive pulse generating means 66 generates a drive pulse V14 and a drive pulse V16 on the basis of the ON and OFF time determined by the calculation means 64. In the drive pulse V14, the same period is set before and after a midpoint of the sampling cycle as the ON period of the main switching element 14. The drive pulse V14 indicates a high level during the ON time and indicates a low level during other periods. The drive pulse V16 is a pulse voltage in the reverse phase with and in synchronization with the drive pulse V14. The drive pulse V16 indicates a low level during the ON period during which the rectifying element 16 is turned OFF and indicates a high level during other periods.

Hereinafter, an operation of the switching power supply device 60 will be described. FIG. 13 illustrates that the switching power supply device 60 is performing a steady-state operation after input is placed. The cycle in which the calculation means 64 samples each signal changes in synchronization with the switching cycle, such as T(k−1), T(k) and T(k+1). The sampling timing is t(k−1), t(k), t(k+1) and t(k+2).

Figure 12:
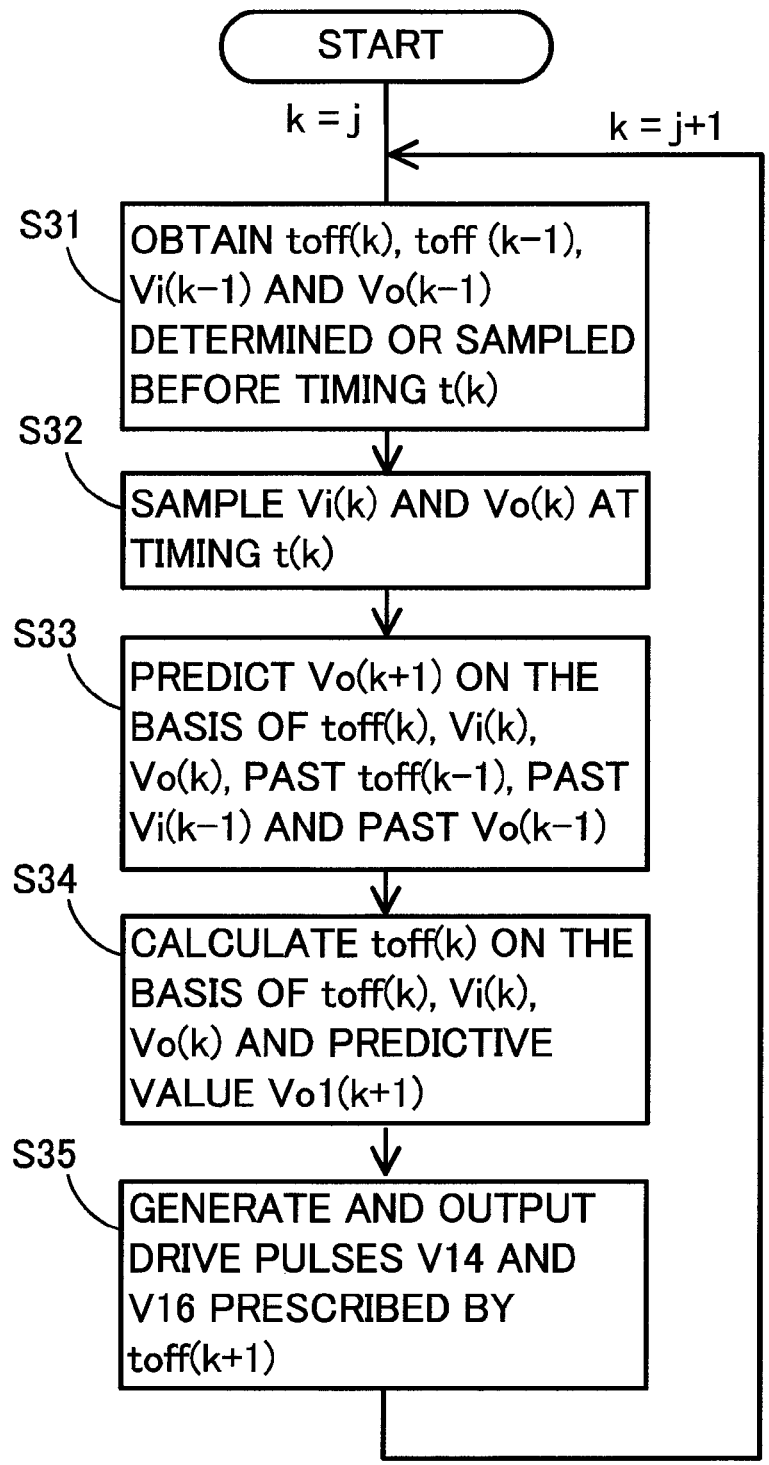
FIG. 12 is a flowchart illustrating a steady-state operation of the fourth embodiment of the present invention.

First, as illustrated in FIG. 12, the calculation means 64 obtains, at timing t(k), OFF time toff(k) and toff(k−1) which the calculation means 64 determined before t(k) and also obtains Vi(k−1) and Vo(k−1) at the timing of t(k−1) (step S31). At the same timing t(k), the calculation means 64 samples an input voltage signal Vi(k) and an output voltage signal Vo(k) (step S32). Then, by substituting the OFF time toff(k), the input voltage signal Vi(k), the output voltage signal Vo(k), the past OFF time toff(k−1), the past input voltage signal Vi(k−1) and the past output voltage signal Vo(k−1) into Formula (13) described above, Vo1(k+1) which is a predicted value of the output voltage signal of the timing t(k+1) is calculated (Step S33). Here, although Formula (13) does not include toff and Vi, it is to be understood that, if u is developed to toff and Vi using Formulae (7) and (15), the predicted value Vo1 is calculatable. Then, using Formula (24) described above, the OFF time toff(k+1) after the next sampling timing t(k+1) is calculated (step 34).

In this manner, the calculation means 64 calculates the OFF time toff(k+1) such that a relationship between the output voltage signal Vo which is to be detected at the next sampling timing t(k+2) and the output differential value Vd satisfy Formula (6).

Next, the drive pulse generating means 66 generates the drive pulse V14 and the drive pulse V16 after the timing t(k+1) on the basis of the OFF time toff(k+1) determined in step S34 and ON time ton which is a fixed value (step S35). In the drive pulse V14, the same time are set before and after the midpoint of the sampling period T(k+1) as the time of the ON time ton. During that period, the drive pulse V14 indicates a high level during which the main switching element 14 is turned ON. Periods half the OFF time toff(k+1) are provided before and after the ON time ton and, during that period, the drive pulse V14 indicates a low level during which the main switching element 14 is turned OFF. The drive pulse V16 is a pulse voltage having the opposite phase with the drive pulse V14. The drive pulse V14 indicates a low level during that period of the ON time ton, and indicates a high level during the period toff(k+1) before and after the ON time during which the rectifying element 16 is turned ON.

Figure 13:
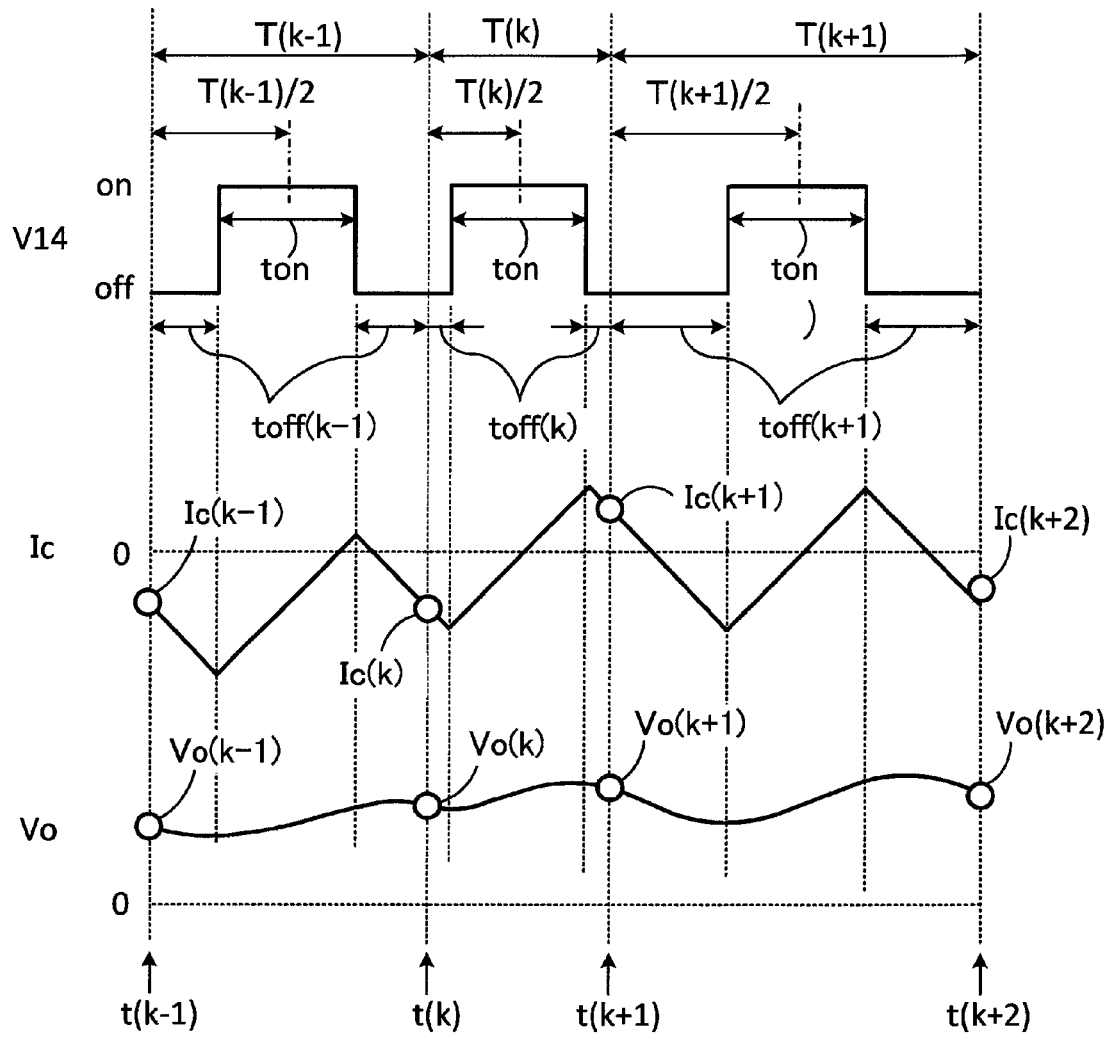
FIG. 13 is a timing diagram illustrating a normal operation of the fourth embodiment of the present invention.

The switching power supply device 60 performs the operation illustrated in FIG. 13 by repeating steps S31 to S35 and is subject to PFM control such that the output voltage becomes equal to the target value Vref. Since the switching power supply device 60 calculates the OFF time toff after the next sampling timing, there is a time-lag by one switching cycle during the control operation as compared with the above-described switching power supply device 10. However, sufficiently practical response speed is ensured. Further, the transient operation of the switching power supply device 60, such as placement of the input, a sudden change in the input and a sudden change in the load, is also substantially the same as the operation of the above-described switching power supply device 10 and thus no transient overshoot or vibration occurs when the output voltage changes. Thus, the switching power supply device 60 can constitute the control circuit 24 with excellent control property even using a relatively inexpensive medium or low speed digital IC.

Figure 14:
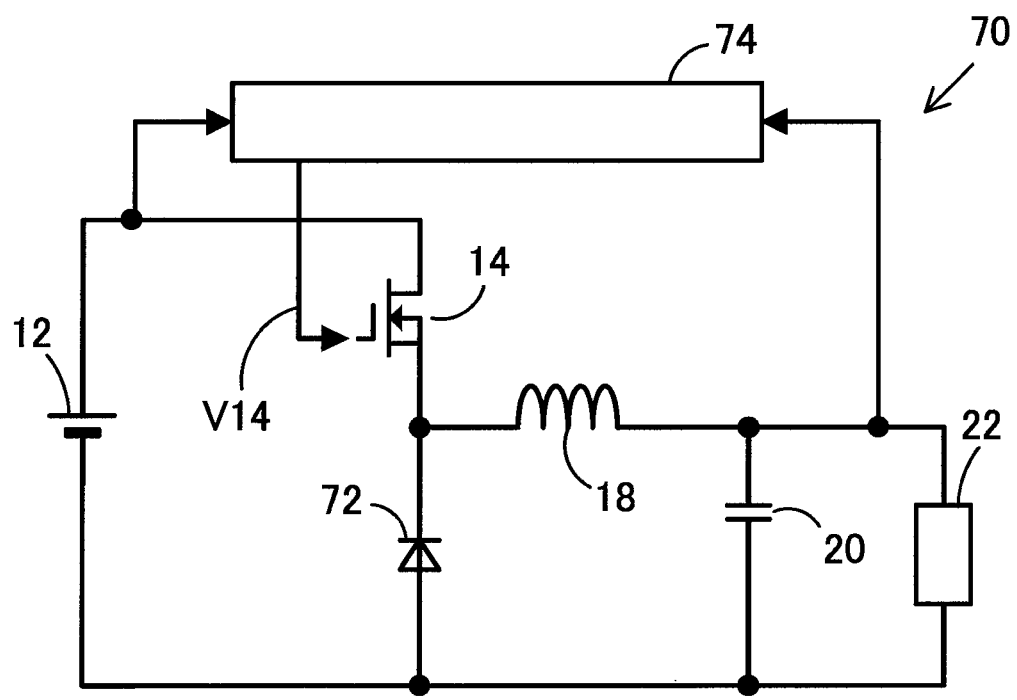
FIG. 14 is a circuit diagram of a fifth embodiment of a switching power supply device of the present invention.

Next, a switching power supply device 70 of a fifth embodiment of the present invention will be described with reference to FIG. 14. Here, components similar to those of the switching power supply device 50 of the third embodiment will be described while being denoted by similar reference numerals. The switching power supply device 70 is provided with a common step-down chopper power converter circuit as in the above-described switching power supply device 50. That is, the power converter circuit performs power supply to an output side load 22 from an input DC power supply 12 during the ON period of a main switching element 14 and excites a built-in smoothing inductor 18 by the input DC power supply 12. Then, the power converter circuit operates to release excitation energy accumulated in the smoothing inductor 18 during the OFF period of the main switching element 14 and supply power to the output side load 22.

However, the switching power supply device 70 includes, instead of the rectifying element 16 which is a MOSFET, a rectifying element 72 which is a diode capable of conducting from the ground toward a junction point between the main switching element 14 and the smoothing inductor 18, and the control circuit 74 provided instead of the control circuit 24 is configured to only output the drive pulse 14. Since the conduction of the rectifying element 72 is unidirectional, when the output current supplied to the load 22 is reduced to a critical point or below the critical point, the current flowing through the smoothing inductor 18 becomes non-continuous and a zero current period occurs.

In the control circuit 74, unlike the operation of the control circuit 24 of the above-described switching power supply device 50, an unillustrated calculation means and the like calculates the time ratio δ by performing sampling at timings at which the main switching element 14 is turned OFF for each switching cycle. Since this sampling timing is not in the zero current period, the output control on the basis of Formula (6) using the output differential value Vd does not become impossible. Since Formula (24) does not hold when the output current is reduced to a critical point or below the critical point, then the time ratio δ is calculated on the basis of a specific calculation formula that is different from Formula (24). An unillustrated drive pulse generating means operates to generate a drive pulse V14 of which a period starting at the sampling timing is defined as the OFF period of the main switching element 14. Operations of the control circuit 74 other than that described above, i.e., calculating the time ratio δ of the period after the next sampling timing under certain conditions with the constant switching cycle (PWM control is performed), are the same as those of the control circuit 24 of the switching power supply device 50.

The thus-configured switching power supply device 70 employs a diode as the rectifying element 72 and has the same advantageous operation and effect as those of the above-described switching power supply device 50. However, there is the zero current period in the switching power supply device 70, it requires caution because, unlike the switching power supply device 40 of the second embodiment described with reference to FIG. 6, a configuration of the control circuit 24 which performs sampling of the input voltage signal Vi and the like every half cycle of the switching cycle and defines the periods before and after the second sampling timing in one switching cycle as the ON period of the main switching element 14 is not applicable to an unillustrated calculation means and the like provided in the control circuit 74.

Figure 15:
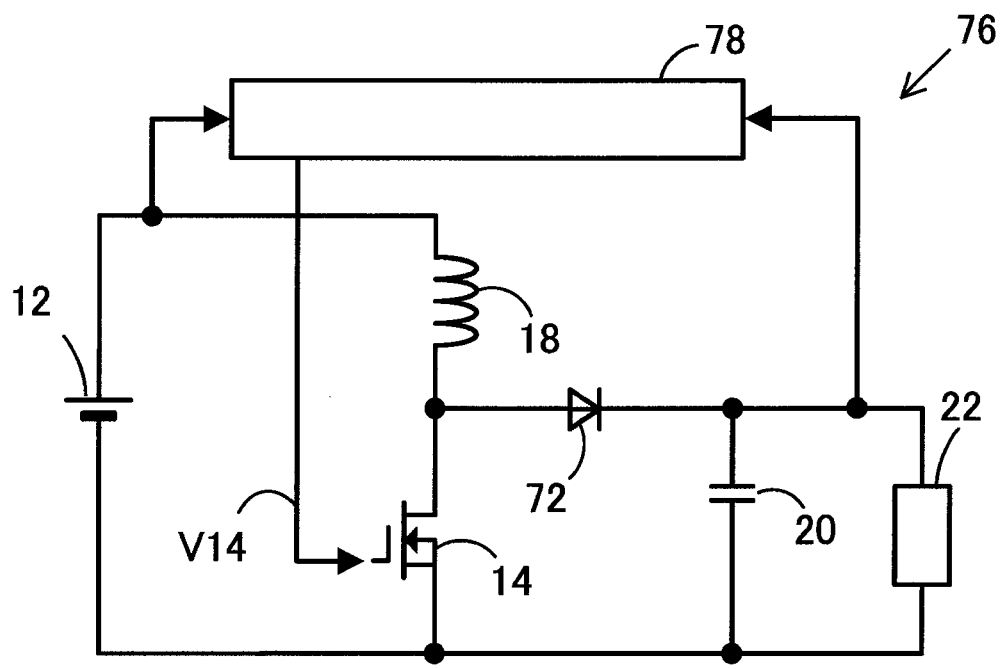
FIG. 15 is a circuit diagram of a sixth embodiment of a switching power supply device of the present invention.

Next, a switching power supply device 76 of a sixth embodiment of the present invention will be described with reference to FIG. 15. Here, components similar to those of the above-described switching power supply device 70 will be described while being denoted by similar reference numerals. Unlike the switching power supply device 70 described above, the switching power supply device 76 includes a common step-up chopper power converter circuit. That is, the power converter circuit stops power supply to an output side load 22 from an input DC power supply 12 is stopped during the ON period of a main switching element 14 and excites a built-in smoothing inductor 18 by the input DC power supply 12. Then, during the OFF period of the main switching element 14, the power converter circuit operates to release excitation energy accumulated in the smoothing inductor 18 to the output side via the rectifying element 72 which is a diode and supply power to the load 22. During the OFF period of the main switching element 14, power is also supplied from the input DC power supply 12 to the output side load 22.

The operation of the switching power supply device 76 differs from that of the above-described switching power supply device 70 in that the power supply from the input DC power supply 12 to the output side load 22 is stopped during the ON period of the main switching element 14. Therefore, control of the output becomes impossible unless the timings at which a calculation means and the like of a later-described control circuit 78 performs sampling are set during the OFF period of the main switching element 14. Since the conduction of the rectifying element 72 is unidirectional, when the output current supplied to the load 22 is reduced to a critical point or below the critical point, the current flowing through the smoothing inductor 18 becomes non-continuous and a zero current period occurs. Therefore, it is necessary to set the sampling timing during the period other than the above-described zero current period.

In the control circuit 78, in order to avoid the state in which the output is not controllable, an unillustrated calculation means and the like performs sampling at timing immediately after the main switching element 14 is turned from ON to OFF for each switching cycle of the main switching element 14 (i.e., in a state in which the smoothing inductor 18 is releasing excitation energy) and an unillustrated drive pulse generating means generates a drive pulse V14 of which a period starting immediately before that sampling timing is defined as the OFF period of the main switching element 14. Details of the calculation performed by the calculation means are expressed by a calculation formula specific to a step-up chopper that is different from, for example, Formula (24) that is specific to a step-down chopper. Since an amplitude component for each switching cycle of the capacitor current can be a cause of a deviation in the setting of the output voltage, the calculation formulae should be developed in consideration of this fact. Operations of the control circuit 78 other than that described above, i.e., calculating the time ratio δ during the period after the next sampling timing under certain conditions with the constant switching cycle (PWM control is performed), are the same as those of the control circuit 74 of the switching power supply device 70.

The thus-configured switching power supply device 76, which includes a step-up chopper power converter circuit and employs a diode as the rectifying element 72, has the same advantageous operation and effect as those of the above-described switching power supply device 70.

Figure 16:
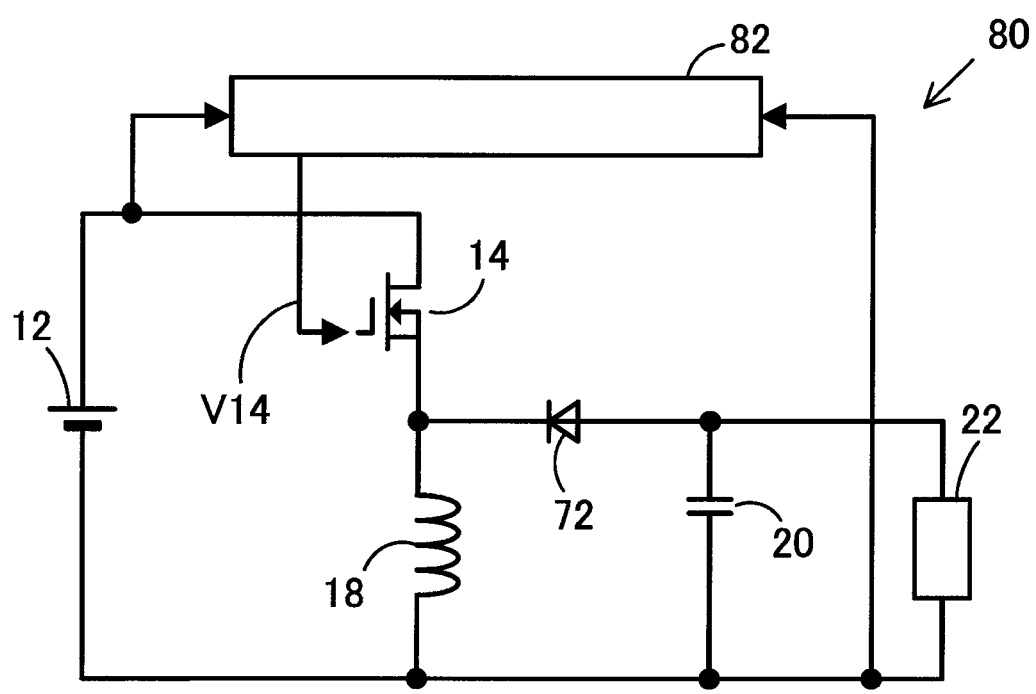
FIG. 16 is a circuit diagram of a seventh embodiment of a switching power supply device of the present invention.

Next, a switching power supply device 80 of a seventh embodiment of the present invention will be described with reference to FIG. 16. Here, components similar to those of the above-described switching power supply device 76 will be described while being denoted by similar reference numerals. Unlike the switching power supply device 76 described above, the switching power supply device 80 includes a common step-up/down chopper power converter circuit. That is, the power converter circuit stops power supply to an output side load 22 from an input DC power supply 12 and excites a built-in smoothing inductor 18 by the input DC power supply 12 during the ON period of a main switching element 14. Then, during the OFF period of the main switching element 14, the power converter circuit operates to release excitation energy accumulated in the smoothing inductor 18 to the output side via the rectifying element 72 which is a diode and supply power to the load 22.

The operation of the switching power supply device 80 differs from that of the above-described switching power supply device 76 in that the power supply from the input DC power supply 12 to the output side load 22 is not performed during the OFF period of the main switching element 14. However, conditions to avoid the state in which the output is not controllable are the same as those of the switching power supply device 76. In a later-described control circuit 82, it is necessary that the timings at which the calculation means and the like performs sampling be set during the OFF period of the main switching element and during a period other than the above-described zero current period.

In the control circuit 82, like the control circuit 78 of the above-described switching power supply device 76, an unillustrated calculation means and the like performs sampling at a timing immediately after the main switching element 14 is turned from ON to OFF for each switching cycle of the main switching element 14 in order to avoid the state in which the output is not controllable. An unillustrated drive pulse generating means generates a drive pulse V14 of which a period starting immediately before that sampling timing is defined as the OFF period of the main switching element 14. Further, details of the calculation performed by the calculation means are expressed by a calculation formula specific to a step-up/down chopper that is different from a formula of a step-up chopper. Since an amplitude component for each switching cycle of the capacitor current can be a cause of a deviation in the setting of the output voltage, the calculation formulae should be developed in consideration of this fact.

The thus-configured switching power supply device 80, provided with a step-up/down chopper power converter circuit, has the same advantageous operation and effect as those of the above-described switching power supply device 76.

Figure 17:
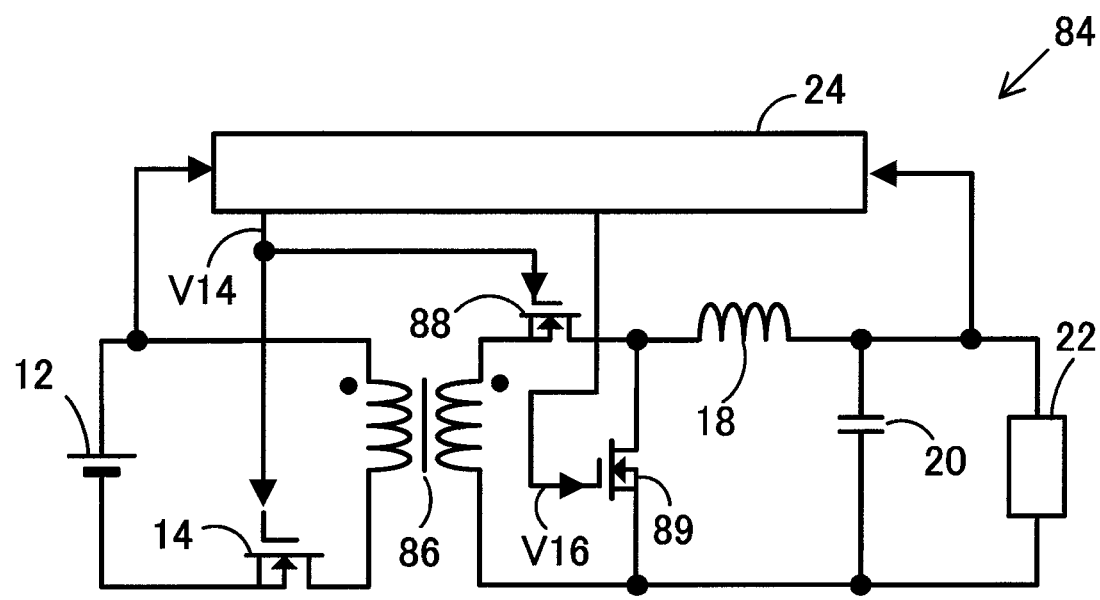
FIG. 17 is a circuit diagram of an eighth embodiment of a switching power supply device of the present invention.

Next, a switching power supply device 84 of an eighth embodiment of the present invention will be described with reference to FIG. 17. Here, components similar to those of the switching power supply device 10 of the first embodiment will be described while being denoted by similar reference numerals. The switching power supply device 84 includes a single-ended forward power converter circuit configured by adding a transformer 86, a rectification side synchronous rectifying element 88 and a commutation side synchronous rectifying element 89 to the power converter circuit of the above-described switching power supply device 10. That is, the power converter circuit performs power supply to an output side load 22 from an input DC power supply 12 via the transformer 86 and the rectification side synchronous rectifying element 88 during the ON period of a main switching element 14 and excites a smoothing inductor 18 by the input DC power supply 12. Then, the power converter circuit operates to continuously supply power to the output side load 22 by releasing excitation energy accumulated in the smoothing inductor 18 even during the OFF period of the main switching element 14. Therefore, by driving the rectification side synchronous rectifying element 88 with a pulse voltage in the same phase with the drive pulse V14 for the main switching element 14 and by driving the commutation side synchronous rectifying element 89 with a drive pulse V16 in the opposite phase with the drive pulse V14, an output voltage is controlled by the same operation as in the switching power supply device 10.

The thus-configured switching power supply device 84, provided with a single-ended forward power converter circuit and control is performed in the same manner as in the switching power supply device 10 which includes a step-down chopper power converter circuit, has the same advantageous operation and effect as those of the switching power supply device 10.

Figure 18:
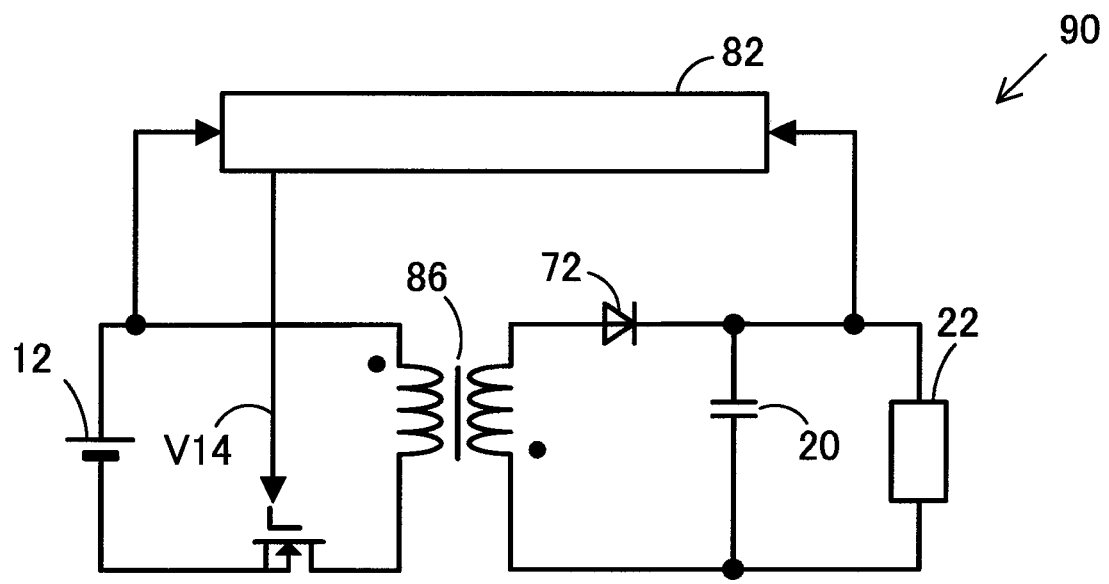
FIG. 18 is a circuit diagram of a ninth embodiment of a switching power supply device of the present invention.

Next, a switching power supply device 90 of a ninth embodiment of the present invention will be described with reference to FIG. 18. Here, components similar to those of the switching power supply device 80 of the seventh embodiment will be described while being denoted by similar reference numerals. The switching power supply device 90 includes a flyback power converter circuit configured by adding a transformer 86 to the power converter circuit of the above-described switching power supply device 80. That is, the power converter circuit stops power supply to an output side load 22 from an input DC power supply 12 during the ON period of a main switching element 14 and excites a transformer 86 which is an inductance element by the input DC power supply 12. Then, during the OFF period of the main switching element 14, the power converter circuit operates to release excitation energy accumulated in the transformer 86 to the output side via the rectifying element 72 which is a diode and supply power to the load 22.

The control circuit 82 operates in a similar manner to the control circuit 82 of the above-described switching power supply device 80. That is, an unillustrated calculation means and the like performs sampling at a timing immediately after the main switching element 14 is turned from ON to OFF for each switching cycle of the main switching element 14 in order to avoid the state in which the output is not controllable, and an unillustrated drive pulse generating means operates to generate a drive pulse V14 of which a period starting immediately before that sampling timing is defined as the OFF period of the main switching element 14.

The thus-configured switching power supply device 90, which is provided with a flyback power converter circuit and in which control is performed in the same manner as in the switching power supply device 80 provided with a step-up/down chopper power converter circuit, has the same advantageous operation and effect as those of the switching power supply device 80.

Figure 19:
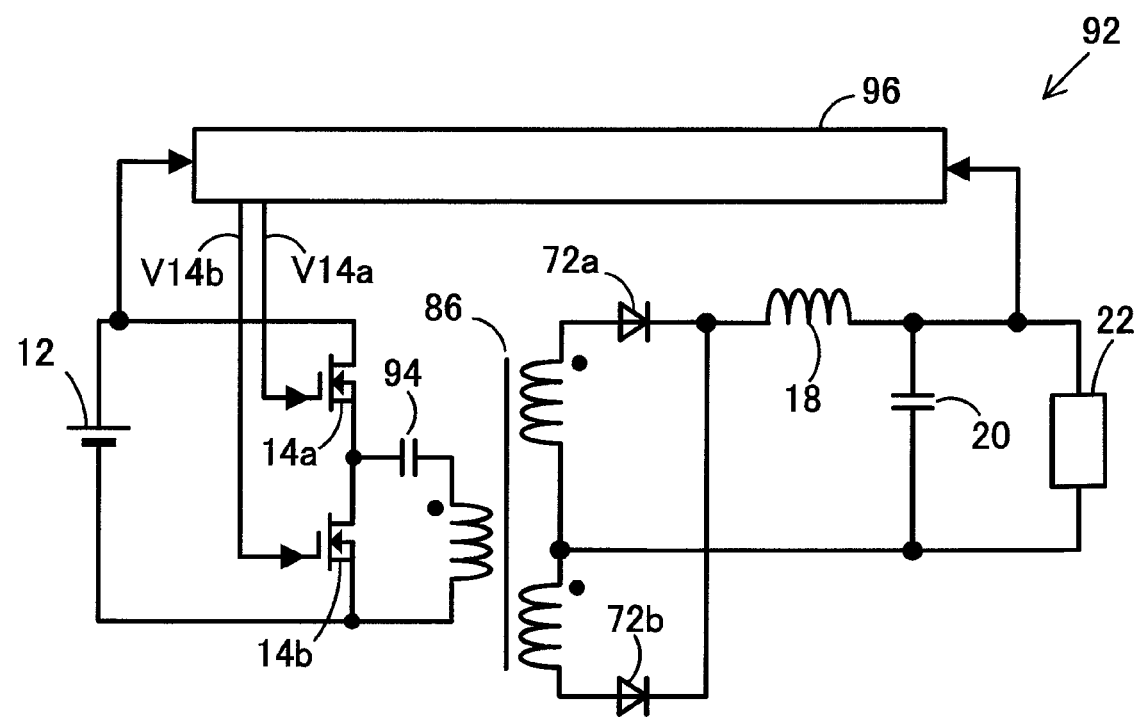
FIG. 19 is a circuit diagram of a tenth embodiment of a switching power supply device of the present invention.

Next, a switching power supply device 92 of a tenth embodiment of the present invention will be described with reference to FIG. 19. Here, components similar to those of the switching power supply device 70 of the fifth embodiment will be described while being denoted by similar reference numerals. The switching power supply device 92 includes a common half bridge power converter circuit which is constituted by two main switching elements 14a and 14b, a coupling capacitor 94, a transformer 86, two rectifying elements 72a and 72b which are diodes, a smoothing inductor 18 and a smoothing capacitor 20. In this power converter circuit, the main switching elements 14a and 14b receive drive pulses V14a and V14b from a control circuit 96 and are alternately turned ON and OFF for each switching cycle. The power converter circuit performs power supply to an output side load 22 from an input DC power supply 12 via the transformer 86 and the rectifying elements 72a and 72b during the ON period of main switching elements 14a and 14b and excites the smoothing inductor 18 by the input DC power supply 12. The power converter circuit operates to supply power to the output side load 22 by releasing excitation energy accumulated in the smoothing inductor 18 during the OFF period of the main switching elements 14a and 14b.

In the control circuit 96, like the control circuit 74 of the above-described switching power supply device 70, an unillustrated calculation means and the like performs sampling at a timing at which the main switching element 14a or 14b is turned from ON to OFF for each switching cycle in order to avoid the state in which the output is not controllable. An unillustrated drive pulse generating means operates to generate the drive pulse V14a and V14b of which a period starting at the sampling timing is defined as the OFF period of the main switching element 14a or 14b.

The thus-configured switching power supply device 92, which is provided with a half bridge power converter circuit having a plurality of main switching elements and in which control is performed in the same manner as in the switching power supply device 70 provided with a step-down chopper power converter circuit, has the same advantageous operation and effect as those of the switching power supply device 70. Further, switching power supply devices provided with a power converter circuit with a plurality of switching elements, such as a push-pull power converter circuit, a full bridge power converter circuit and a cascade forward power converter circuit, may also be configured from a viewpoint similar to that of the switching power supply device 92.

Figure 20:
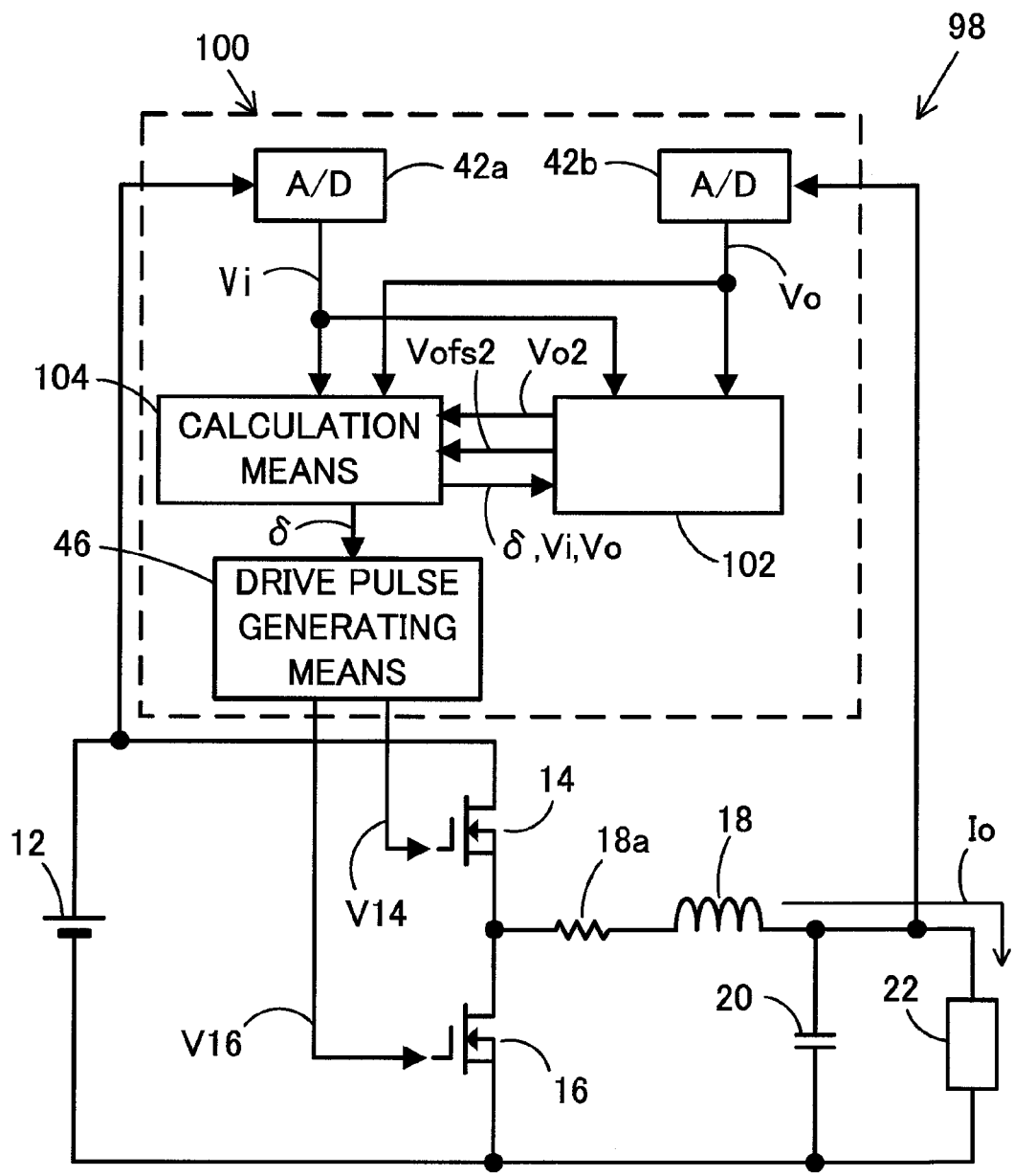
FIG. 20 is a circuit diagram of an eleventh embodiment of a switching power supply device of the present invention.

Next, a switching power supply device 98 of an eleventh embodiment of the present invention will be described with reference to FIG. 20. Here, components similar to those of the above-described switching power supply device 40 will be described while being denoted by similar reference numerals. A configuration of a power converter circuit of the switching power supply device 98 is a step-down chopper type which is the same as that of the switching power supply device 40 illustrated in FIG. 6.

A control circuit 100 is constituted by A/D converters 42a and 42b, a state variable estimation means 102, a calculation means 104 and a drive pulse generating means 46. That is, in addition to the configuration of the control circuit 24 of the switching power supply device 40 illustrated in FIG. 4, a state variable estimation means 102 is provided newly, and the calculation means 104 which performs an operation corresponding to the state variable estimation means 102 is provided instead of the calculation means 44. Further, parasitic resistance 18a of coil of the smoothing inductor 18 is illustrated clearly in the circuit diagram. This parasitic resistance 18a is a kind of parasitic impedance which exists on a path on which an output current Io flows. In the present embodiment, in order to improve output voltage precision, the calculation means 104 calculates the time ratio δ to include a voltage drop component Vofs due to the parasitic resistance 18a.

Analog information of which input voltage and output voltage have been detected is input in the A/D converters 42a and 42b, which sample the information at predetermined timings and output an input voltage signal Vi and an output voltage signal Vo which have been converted into digital information. The sampling is performed for every half the cycle of the switching cycle of a main switching element 14. The sampling timing is arbitrarily determined during the ON time of the main switching element 14 or during a period during which a smoothing inductor 18 is releasing, to an output side, excitation energy accumulated during the ON time.

The state variable estimation means 102 is for estimating, using a detected value of a specific circuit component, an operating state of a location which is difficult to be detected. Here, on the basis of the input voltage signal Vi and the output voltage signal Vo which are relatively easily detected and on the basis of the time ratio δ determined by the calculation means 104 immediately before the sampling, an estimated value Vo2 of the output voltage signal which is to be detected at the next sampling timing, and an estimated value Vofs2 of a voltage drop component at the next sampling timing are calculated.

Since a control circuit 100 of the switching power supply device 98 is constituted by a relatively inexpensive and general-purpose digital IC, the time required for the calculation process and the like performed by the calculation means 104 is not ignorable. Therefore, this calculation means 104 calculates the time ratio δ of the period after the next sampling timing. Here, the ON-time ratio δ is calculated under conditions that the total of the ON and OFF time is kept constant and that certain PWM control is performed such that the switching cycle becomes constant.

The calculation means 104 samples the input voltage signal Vi which is a detected value, the output voltage signal Vo2 which is an estimated value of the state variable estimation means 102 and a voltage drop component Vofs2 at predetermined timings for every half the cycle of the switching cycle as described above. The calculation means 104 then performs a predetermined calculation process on the basis of these signals and calculates a time ratio δ of the period after the next sampling timing. The calculation means 104 also operates to output the time ratio δ and the like which were calculated in the past toward the state variable estimation means 102.

Figure 21:
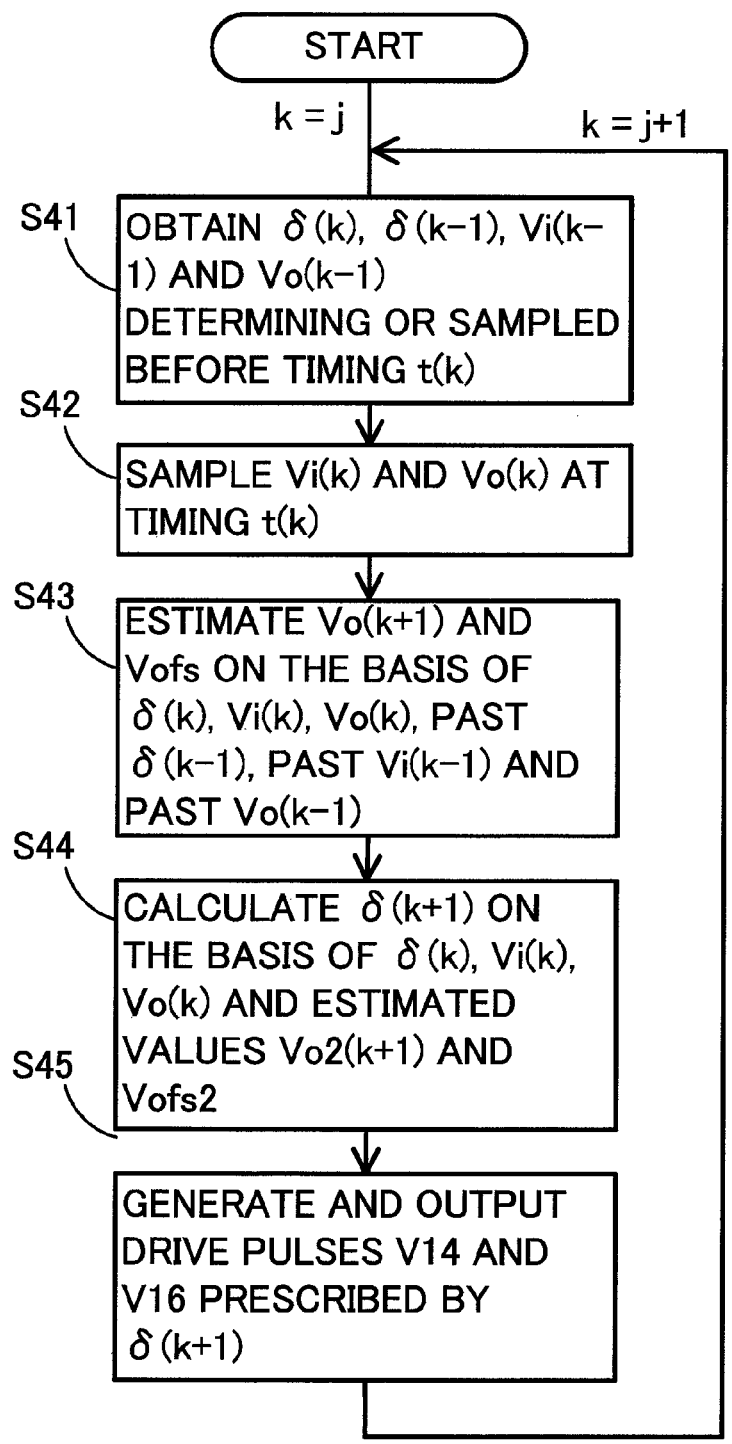
FIG. 21 is a flowchart illustrating a steady-state operation of the eleventh embodiment of the present invention.

Hereinafter, a steady-state operation of the switching power supply device 98 will be described with reference to a flowchart of FIG. 21. Here, since the timing diagram illustrating the behavior of the switching power supply device 98 is substantially the same as FIG. 7 which illustrates the behavior of the switching power supply device 40, refer to FIG. 7.

First, the state variable estimation means 102 obtains, at timing t(k), time ratios δ(k) and δ(k−1) which the calculation means 104 determined before t(k) and also obtains Vi(k−1) and Vo(k−1) which the calculation means 104 sampled before t(k) (step S41). At the same timing t(k), the state variable estimation means 102 samples the input voltage signal Vi(k) and the output voltage signal Vo(k) which are detected values (step S42). Then, on the basis of the input voltage signal Vi(k), the output voltage signal Vo(k), the time ratio δ(k), the past time ratio δ(k−1), the past input voltage signal Vi(k−1) and the past output voltage signal Vo(k−1), state variable estimation means 102 calculates an estimated value Vo2(k+1) of the output voltage signal at the timing of t(k+1) and an estimated value Vofs2 (k+1) of the voltage drop component (step S43).

Then, the calculation means 104 substitutes the time ratio δ(k), the input voltage signal Vi(k) and the output voltage signal Vo(k), the estimated value Vo2(k+1) and the voltage drop component Vofs (k+1) into the next Formula (25), and calculates the time ratio δ(k+1) after the next sampling timing t(k+1) (step S44).

[Formula 25]

$$\delta(k+1) = \frac{1}{(2-s) \cdot b1 \cdot Vi(k)} \cdot \begin{bmatrix} \{(s-1) \cdot a1 - a2\} \cdot Vo(k+1) + \\ (s-1) \cdot a2 \cdot Vo(k) + \\ (s-1) \cdot b2 \cdot u(k) - s \cdot Vref + \\ \left(s - \frac{3}{2}\right) \cdot Vofs \end{bmatrix} \quad (25)$$

[Formula 26]

$$Vofs = -\frac{T^2}{L \cdot C} \cdot R \cdot Io \quad (26)$$

Formula (25) includes the voltage drop component Vofs at the last term of the right side thereof. The voltage drop component Vofs is defined by Formula (26) and is expressed by, for example, a resistance value R of the parasitic resistance 18a of the smoothing inductor 18. Formula (26) is the above-described Formula (2). Formula (25) may be developed in the same concept as described above by substituting "Vo(k)" of Formula (8) by "Vo(k)+R·Io." Here, the output current Io and the resistance value R of the parasitic resistance 18a are treated similarly as the circuit constants of, for example, the inductance L of the smoothing inductor 18 and the capacitance C of the smoothing capacitor 20, and the voltage drop component Vofs can be treated as a composite constant.

Then, after step S44, the drive pulse generating means 46 generates the drive pulse V14 and the drive pulse V16 after the timing t(k+1) on the basis of the time ratio δ(k+1) calculated by the calculation means 104 (step S45).

The switching power supply device 98 is subject to PWM control by repeating steps S41 to S45 such that the output voltage becomes equal to a target value Vref. Since the calculating means 104 calculates the time ratio δ after the next sampling timing, there is a time-lag by half the cycle of the switching cycle during the control operation as compared with the above-described switching power supply device 40. However, sufficiently practical response speed is ensured. Since output voltage control in consideration of the voltage drop component Vofs due to the parasitic resistance 18a which exists on the path on which the output current Io flows is performed, precision in the output voltage is further improved. Further, the transient operation of the switching power supply device 98, such as placement of the input, a sudden change in the input and a sudden change in the load, is also substantially the same as the operation of the above-described switching power supply device 40 and thus no transient overshoot or vibration occurs when the output voltage changes. Thus, the switching power supply device 98 can constitute the control circuit 100 with excellent control property even using a relatively inexpensive medium or low speed digital IC.

Figure 22:
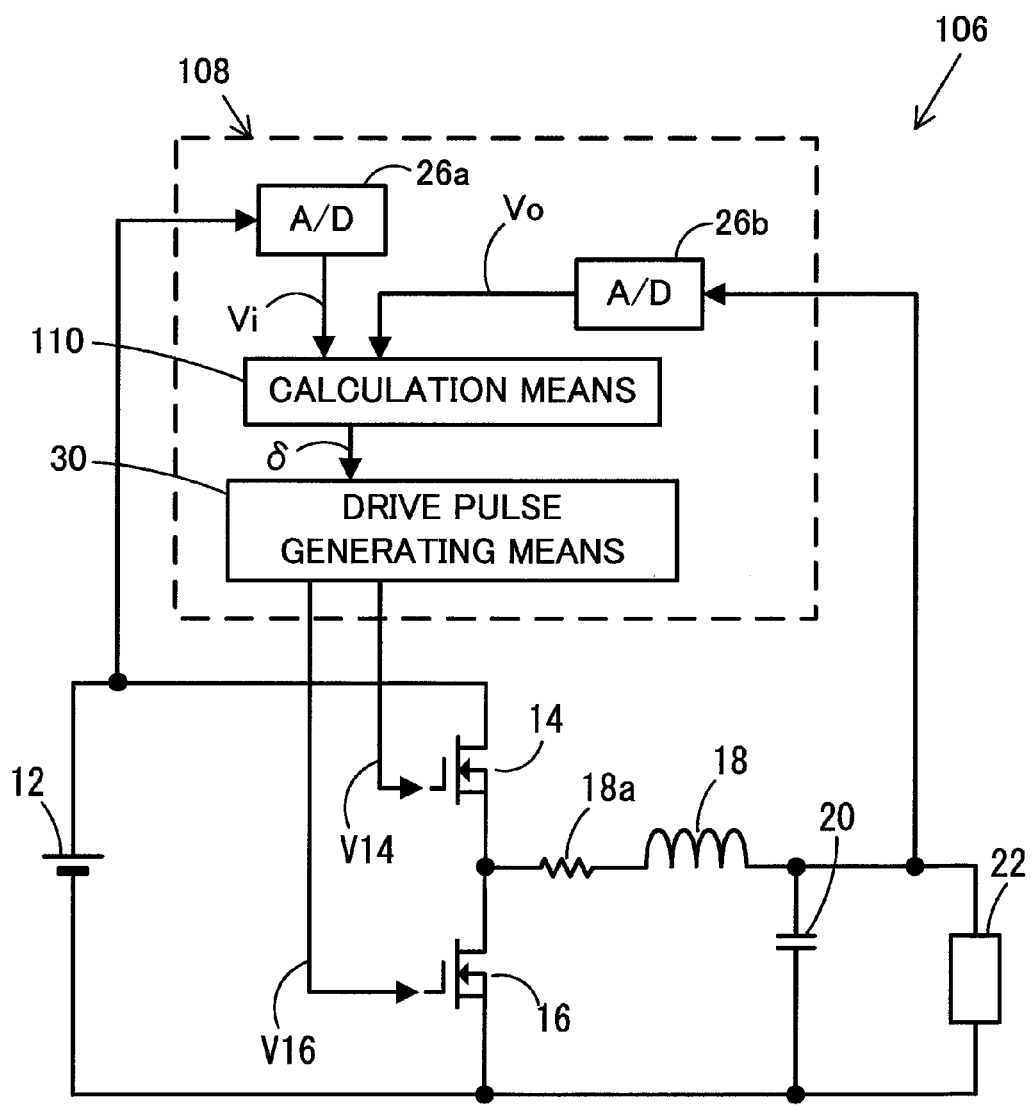
FIG. 22 is a circuit diagram illustrating a twelfth embodiment of a switching power supply device of the present invention.

Next, a switching power supply device 106 of a twelfth embodiment of the present invention will be described with reference to FIG. 22. Here, components similar to those of the above-described switching power supply device 10 will be described while being denoted by similar reference numerals. A power converter circuit of the switching power supply device 106 is a step-down chopper circuit which is the same as that of the switching power supply device 10. Further, a control circuit 108 includes a calculation means 110 instead of the calculation means 28 of the control circuit 24 of the above-described switching power supply device 10. Further, parasitic resistance 18a of coil of the smoothing inductor 18 is illustrated clearly in the circuit diagram. Here, since a voltage drop component Vofs due to parasitic resistance 18a is large, an influence on output voltage control is unignorable and it is considered when the calculation means 110 calculates time ratio δ in order to improve output voltage precision.

The calculation means 110 operates in a similar manner to the control circuit 28 of the switching power supply device 10. Further, the calculation means 110 periodically performs parameter estimation and updates a circuit constant initially set as a default value in the calculation means 110, and performs output voltage control in consideration of an individual difference, a temperature change and variation with time of the circuit constant. The circuit constant herein means the switching cycle T of the main switching element 14, the inductance L of the smoothing inductor 18, the capacitance C of the smoothing capacitor 20, the output current Io, the resistance value R of the parasitic resistance 18a and the voltage drop component Vofs.

Here, an evaluation function J(N) for parameter estimation which is defined in the calculation means 110 will be described. First, the voltage drop component Vofs is incorporated in Formula (13), k+1 is substituted by k, k is substituted by k−1, k−1 is substituted by k−2 to obtain Formula (27).

[Formula 27]

$$Vo(k)=a1 \cdot Vo(k-1)+a2 \cdot Vo(k-2)+b1 \cdot u(k-1)+b2 \cdot u(k-2)+Vofs \quad (27)$$

The composite constants a1, a2, b1 and b2 included in Formula (27) and the composite constant Vofs which is the voltage drop component are defined by Formulae (16) to (18) and Formula (26). u(k−1) and u(k−2) are the same as those of Formula (15).

Parameter estimation may be performed also in a unit of a plurality of circuit constants, such as the inductance L and the capacitance C, or in a unit of the composite constants, such as a1 and a2, Here, however, speeding-up of the process of the calculation means 110 is intended while keeping the equivalent estimation precision by reducing the number of composite constants to estimate and reducing the number of times of calculation.

In Formula (27), when the composite constants a1, a2, b1 and b2 are represented by each circuit constant and when a new composite constant p expressed in Formula (28) is defined, Formula (27) can be transformed as Formula (29). Formula (28) is the above-described Formula (1).

[Formula 28]

$$p = \frac{T^2}{2 \cdot L \cdot C} \quad (28)$$

[Formula 29]

$$Vo(k) - [2 \cdot Vo(k-1) - Vo(k-2)] = \\ p \cdot [-Vo(k-1) - Vo(k-2) + u(k-1) + u(k-2)] + Vofs \quad (29)$$

Formula (29) does not include any composite constant in the left side and does not include any composite constant in a parenthesis of the first term of the right side. Then, the entire left side is expressed as a composite signal v1(k) as Formula (30) and inside of the parenthesis of the first term of the right side is expressed as a composite signal v2(k) as Formula (31). Then, Formula (32) is obtained. Formulae (30) and (31) are above-described Formulae (4) and (5).

[Formula 30]

$$v1(k) = Vo(k) - [2 \cdot Vo(k-1) - Vo(k-2)] \quad (30)$$

[Formula 31]

$$v2(k) = -Vo(k-1) - Vo(k-2) + Vi(k-1) \cdot \delta(k-1) + Vi(k-2) \cdot \delta(k-2) \quad (31)$$

[Formula 32]

$$v1(k) = p \cdot v2(k) + Vofs \quad (32)$$

Next, an evaluation function for parameter estimation is defined. An original purpose of the control circuit 108 is to control output voltage with high precision. Therefore, it is desirable to perform parameter estimation on the basis of the output voltage signal Vo. Especially, in order to perform parameter estimation with high precision, it is considered to evaluate a difference between a detected value Voa(k) at the timing t(k) and an estimated value Vob(k) at the timing t(k) predicted before the timing t(k) and to define the evaluation function Jx(N) as Formula (33).

[Formula 33]

$$Jx(N) = \frac{1}{N} \sum_{k=1}^{N} [Voa(k) - Vob(k)]^2 \quad (33)$$

In this case, an average value of a square of predictive errors obtained at each of the timings t(1) to t(N) is set to the evaluation function Jx(N).

However, in the control circuit 108, in order to achieve speeding-up of the process of the calculation means 110, the number of kinds of composite constants is further reduced, and a prediction error of the composite signal v1(k) in which a plurality of output voltage signals are combined is used instead of a prediction error of a single output voltage signal Vo. That is, the parameter estimation is to be performed on the basis of a composite signal v1 and, in order to evaluate a difference between a detected value v1a(k) at the timing t(k) and a predicted value v1b(k) at the timing t(k) predicted therebefore (hereafter, referred to as "prediction error"), the evaluation function J(N) is defined as Formula (34).

[Formula 34]

$$J(N) = \frac{1}{N} \sum_{k=1}^{N} [v1a(k) - v1b(k)]^2 \quad (34)$$

Further, Formula (34) can be expressed as Formula (35) by substituting the predicted value v1b(k) by the right side of Formula (32). Formula (35) is the above-described Formula (3).

[Formula 35]

$$J(N) = \frac{1}{N} \sum_{k=1}^{N} [v1a(k) - p \cdot v2b(k) - Vofs]^2 \quad (35)$$

At this time, v1a(k) included in Formula (34) can be calculated on the basis of the output voltage signals Vo(k), Vo(k−1) and Vo(k−2) which are the detected values sampled at the timings t(k), t(k−1) and t(k−2) as expressed by Formula (30). Therefore, since a term of the output voltage signal Vo(k) which is the current detected value is included in the composite signal v1a(k), the composite signal v1a(k) can be considered to be correspond to the detected value Voa(k) in Formula (33).

As is understood from Formula (31), the composite signal v2b(k) of Formula (35) can be calculated on the basis of the output voltage signals Vo(k−1), Vo(k−2), Vi(k−1) and Vi(k−2) which are detected values sampled at the timings t(k−1) and t(k−2), and the time ratio δ(k−1) and δ(k−2) calculated as a time ratio of the timing t(k−1) and t(k−2). Therefore, since the composite signal v1b(k) including the composite signal v2b(k) does not include the output voltage signal Vo(k) which is the current detected value and both v1b(k) and v2b(k) are constituted by a past detected value and the like, these signals may be considered to correspond to the predictive value Vob(k) in Formula (33).

Figure 23:
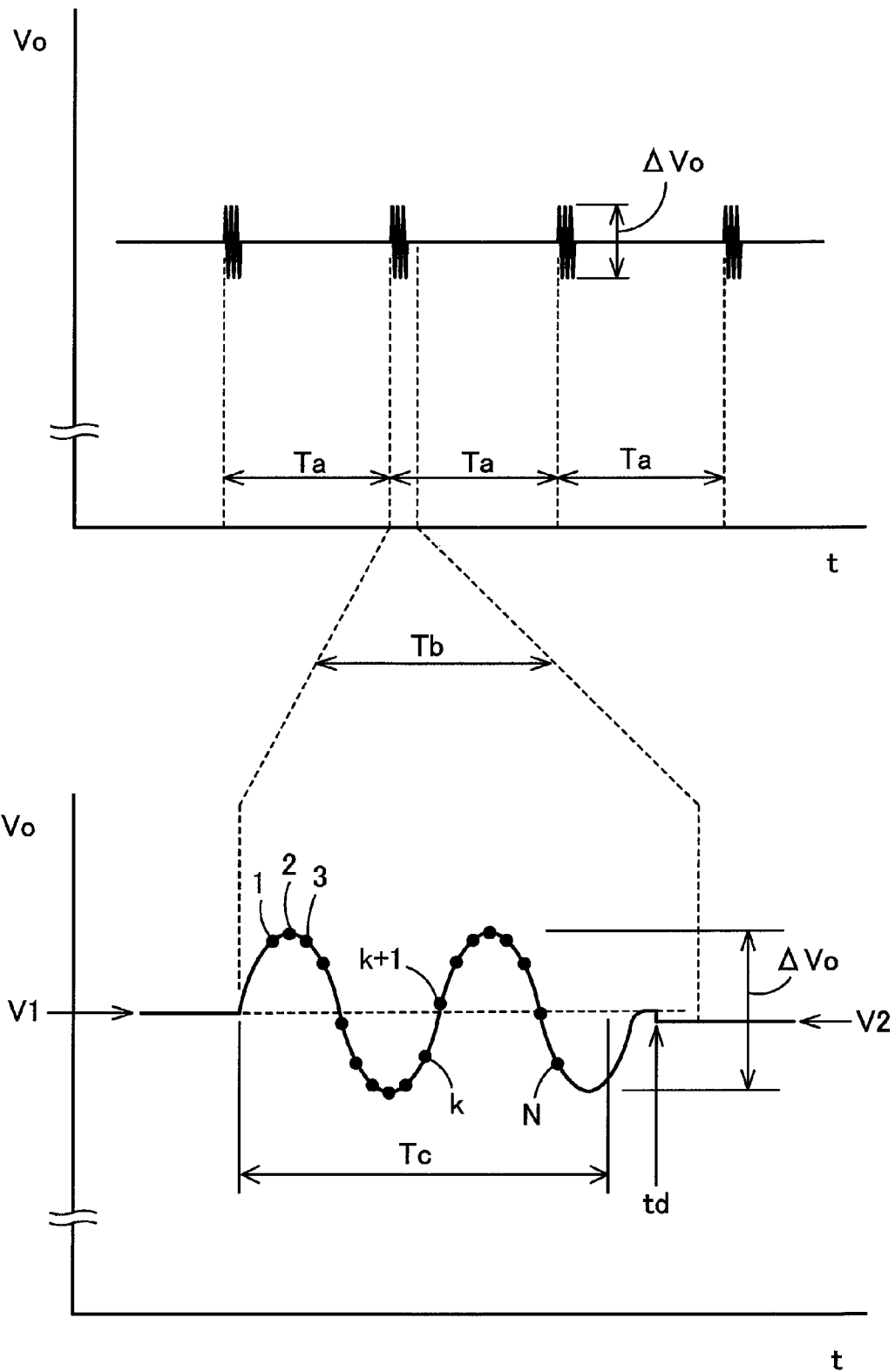
FIG. 23 is a timing diagram illustrating the steady-state operation of the twelfth embodiment of the present invention.

Next, an operation of parameter estimation performed by the calculation means 110 will be described with reference to FIG. 23. As described with reference to FIGS. 1 to 3, the switching power supply device 106 of the present embodiment performs the same steady-state operation as that of the switching power supply device 10 of the first embodiment and the calculation means 110 performs parameter estimation in parallel with the steady-state operation. As illustrated in FIG. 23, parameter estimation is performed once every cycle Ta which is sufficiently longer than the switching cycle T and the parameter estimation is performed during a period Tb.

When the period Tb starts, the calculation means 110 first obtains each of the above-described signals by, for example, sampling N times during a period Tc so that N predictive errors may be obtained. Next, on the basis of the each obtained signal, the calculation means 110 calculates composite constants p and Vofs with which the evaluation function J(N) which is an average value of a square of N predictive errors becomes minimum. At a timing td, the calculation means 110 updates the previous composite constants p and Vofs with newly calculated ones. Therefore, since the output voltage control is performed on the basis of the new composite constants p and Vofs after the update, the output voltage Vo is changed from a previous voltage V1 to a new voltage V2 as illustrated in FIG. 23.

The operation in the above-described period Tb is performed repeatedly for each cycle Ta and the composite constants p and Vofs are updated periodically. Therefore, the control circuit 108 can perform the output voltage control always using proper composite constants. Note that the operation to periodically calculate the composite constants p and Vofs using the evaluation function J(N) of Formula (35) is a kind of parameter estimation using an off-line least square method.

In the switching power supply device 106, as illustrated in FIG. 23, the output voltage Vo is fluctuated up and down on both sides of the voltage V1 during the period Tc during which the output voltage signals Vo(1) to Vo(N) are sampled. This is because, at the time of determining the time ratio δ to perform the above-described steady-state operation, the calculation means 110 causes slight diffusion and fluctuation of the time ratio δ to during the period Tc during which parameter estimation is performed. Diffusion and fluctuation means to randomly increase and decrease the time ratio δ calculated in accordance with the flowchart of FIG. 2, and the output voltage Vo can be made to fluctuate by ΔVo by this diffusion and fluctuation. Therefore, the composite constants p and Vofs can be estimated more precisely by fluctuating the output voltage Vo intentionally using this calculation means 110.

Since the above-described parameter estimation can be performed with a certain or higher precision if the fluctuation ΔVos of the output voltage Vo is 1 mV to 10 mV, it is not necessary to necessarily increase the width of diffusion and fluctuation of the time ratio δ. If precision of parameter estimation is not necessarily high enough, diffusion and fluctuation may not be performed.

As described above, the switching power supply device 106 of the present embodiment has the same advantageous operation and effect as those of the switching power supply device 10 of the first embodiment. Further, since the switching power supply device 106 periodically monitors the individual difference of the circuit constant, the temperature change and the variation with time by performing parameter estimation using the off-line least square method and updates to appropriate values, highly precise output voltage control can be performed continuously.

It is also possible to perform parameter estimation using Formulae (27) and (33). In that case, however, the kind of composite constants (a1, a2 and the like) to estimate increases and, therefore, processing for the parameter estimation takes a certain amount of time. On the contrary, this calculation means 110 has a small number of composite constants to estimate (only two kinds, p and Vofs) and thus has an advantage that estimation process can be performed at a very high speed.

Figure 24:
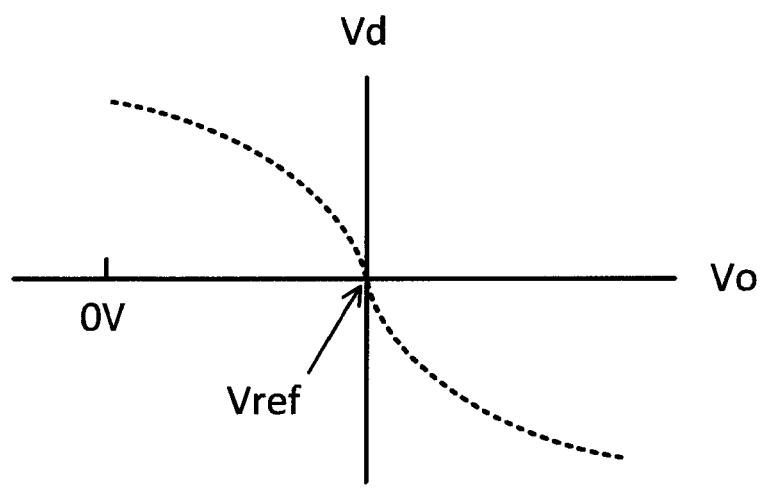
FIG. 24(a) is a graph of another variant of the control function formula.
FIG. 24(b) is a graph illustrating an example of an inappropriate control function formula.
Figure 24:
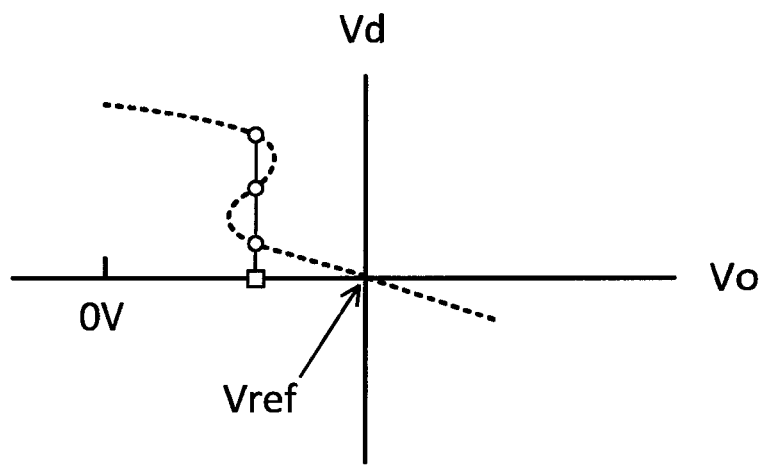

The switching power supply device of the present invention is not limited to the above-described embodiments. For example, the control function formula defined in the calculation means of the control circuit may be a curved relational formula as illustrated in FIG. 24(*a*) instead of the linear relational formula, such as Formulae (6), and (21) to (23), in order to adjust the condition of a change in the output voltage at the time of, for example, placement of the input. However, if a control function formula in which a plurality of output differential values corresponding to a single value of the output voltage exist, e.g., a formula of FIG. 24(*b*), is used, the process of the calculation means described above is not able to be performed properly.

As described in the first to tenth embodiments, when the calculation means of the control circuit calculates the ON time, the OFF time, the time ratio and the like of the main switching element, it is desirable to perform condition setting of "keep the switching cycle constant" and the like. This is because, with the condition setting, the calculation formula for calculating the time ratio and the like can be expressed in a relatively simple form like Formula (20). The present invention can be applied to a switching power supply device of various power converter circuits and the method for the above-described condition setting can be suitably selected depending on the operation of each power converter circuit.

For example, PWM control by which ON time and OFF time are determined on condition that the switching cycle becomes constant (FIGS. 3 and 10), PFM control by which ON time and OFF time are determined on condition that the ON time of the main switching element 14 becomes constant (FIG. 13), and PFM control by which ON time and OFF time are determined on condition that the OFF time of the main switching element 14 becomes constant are applicable to the power converter circuits described in the above embodiments. Especially, PFM control by which ON time and OFF time are determined on condition that the ON time of the main switching element 14 becomes constant (FIG. 13) is suitable for the control of, for example, a power converter circuit provided with a current resonance circuit.

Although not illustrated as an embodiment, PFM control by which ON time and OFF time are determined on condition that the OFF time of the main switching element 14 becomes constant is also possible. This PFM control is suitable for the control of, for example, a power converter circuit provided with a voltage resonance circuit. PFM control by which ON time and OFF time are determined on condition that the time ratio of the ON time to one switching cycle becomes constant is also possible. For example, by applying PFM control to the step-up chopper power converter circuit, the step-up/down chopper power converter circuit, or the flyback power converter circuit described in the above embodiments and causing the power converter circuit to operate such that a zero current period occurs intentionally, an effect can be obtained to prevent occurrence of a recovery current of the rectifying element constituted by a diode and occurrence of switching noise or cross loss of the main switching element.

A configuration in which the calculation means and the like samples in a cycle in synchronization with the switching cycle and the drive pulse generating means generates a drive pulse in which the period before and after a midpoint of the sampling cycle thereof are defined as the ON period or the OFF period of the main switching element (FIGS. 3 and 13) is applicable also to every power converter circuit of the above embodiment by setting the timing at which the calculation means and the like samples to a period other than a zero current period. According to the configuration, the calculation formula with which the calculation means calculates the time ratio and the like can be expressed in a relatively simple primary formula form, e.g., Formula (20), and the process becomes simple. Therefore, even if some processing time is taken in the calculation means and the like, if the setting of the maximum time ratio Dmax or the minimum time ratio Dmin is adjusted suitably, it is possible to mask the influence of the processing time. Therefore, there is an advantage that the above-described control circuit can be configured using a relatively inexpensive medium or low speed digital IC.

A configuration in which the calculation means and the like samples at predetermined timings for every half the cycle of the switching cycle and calculates the time ratio δ of a period until the next sampling timing by performing predetermined calculation (FIG. 6) is not applicable to the step-up chopper power converter circuit, the step-up/down chopper power converter circuit, the flyback power converter circuit and the like because the calculation means and the like performs sampling also during the ON period of the main switching element. However, the configuration is applicable to the step-down chopper power converter circuit, the single-ended forward power converter circuit, the half bridge power converter circuit and the like.

A configuration in which the circuit constant or the composite constant is undated by performing parameter estimation is applicable irrespective of the form of the power converter circuit or the form of the steady-state operation. However, since Formulae (27) to (35) are specific to a step-down chopper circuit and are not able to be directly applied to other power converter circuits. It is necessary to develop formulae independently. Regarding parameter estimation, the iterative least squares technique and known methods other than the least square method may be used in addition to the off-line least square method as described above.

DESCRIPTION OF REFERENCE NUMERALS

10, 40, 50, 60, 70, 76, 80, 84, 90, 92, 98, 106 switching power supply device
14, 14a, 14b main switching element
16, 72, 72a, 72b rectifying element
18 smoothing inductor
20 smoothing capacitor
24, 74, 78, 82, 96, 100, 108 control circuit
26a, 26b, 42a, 42b, 52a, 52b, 62a, 62b A/D converter
28, 44, 54, 64, 104, 110 calculation means
30, 46, 56, 66 drive pulse generating means
86 transformer
88 rectification side synchronous rectifying element
89 commutation side synchronous rectifying element
94 coupling capacitor
102 state variable estimation means

What is claimed is:

1. A switching power supply device comprising a power converter circuit including a main switching element which performs ON and OFF operations and a control circuit which stabilizes an output voltage by controlling the ON and OFF operations, wherein:
   the control circuit includes a calculation means which determines ON time and OFF time of the main switching element, and a drive pulse generating means which generates a drive pulse which turns the main switching element ON and OFF;
   a control function formula is defined in the calculation means, the control function formula being a continuous function formula which includes, as variables, an output voltage and an output differential value representing a fluctuation in the output voltage, and a relationship between the two variables being that only a single output differential value exists corresponding to a single value of the output voltage, the control function formula prescribing that a corresponding output differential value becomes positive when the output voltage is below a target value of stabilization of the output voltage, that the corresponding output differential value becomes negative when the output voltage is above the target value, and that a corresponding output differential value becomes zero when the output voltage is equal to the target value;
   the calculation means samples an input voltage signal of which input voltage has been detected and an output voltage signal of which output voltage has been detected or estimated at timings in synchronization with a switching cycle of the main switching element, performs a calculation process to calculate at least one of ON time and OFF time of the main switching element in the switching cycle after the sampling timing such that the output voltage signal and the output differential value at the next sampling timing or thereafter derived on the basis of the two sampled signals satisfy the relationship prescribed in the control function formula;
   the calculation means performs parameter estimation about a circuit constant of the power converter circuit which is initially set as a default value, and updates the circuit constant such that a difference between an actual output voltage signal sampled by the calculation means and an output voltage signal at the sampling timing predicted when the ON time and the OFF time are determined in the past becomes small; and
   the drive pulse generating means generates the drive pulses such that the main switching element is turned ON and OFF in a switching cycle after the sampling timing of the two signals on the basis of the ON time and the OFF time determined by the calculation means.

2. The switching power supply device according to claim 1 wherein the calculation means performs the sampling of each signal and the calculation process for calculating at least one of the ON time and the OFF time for every switching cycle of the main switching element.

3. The switching power supply device according to claim 2 wherein:
   the power converter circuit stops supplying power to an output from an input DC power supply and excites a built-in inductance element by the input DC power supply during an ON period of the main switching element, and releases excitation energy accumulated in the inductance element to the output and supplies power during an OFF period of the main switching element; and
   the calculation means performs the sampling of each signal during the period during which the inductance element is releasing excitation energy.

4. The switching power supply device according to claim 2 wherein the drive pulse generation means generates a drive pulse in which the same periods are defined as the ON period of the main switching element before and after a midpoint of the sampling cycle of each signal, or generates a drive pulse in which the same periods are defined as the OFF period of the main switching element before and after the midpoint of the cycle of sampling.

5. The switching power supply device according to claim 1 wherein:
   the power converter circuit supplies power to an output from the input DC power supply and excites a built-in inductance element by the input DC power supply during the ON period of the main switching element, and releases excitation energy accumulated in the inductance element to the output so as to continuously supply the power during the OFF period of the main switching element;

the calculation means performs the sampling of each signal and the calculation process for calculating at least one of the ON time and OFF time in half the cycle of the switching cycle of the main switching element; and the drive pulse generation means generates a drive pulse in which periods before and after a second sampling timing in one switching cycle are defined as the ON period of the main switching element or generates a drive pulse in which periods before and after a second sampling timing in one switching cycle are defined as the OFF period of the main switching element.

6. The switching power supply device according to claim 1 wherein:

the control circuit is provided with a state variable estimation means which estimates, using a detected value of a specific circuit component, an operating state of a location which is difficult to be detected;

the state variable estimation means obtains, at the timing at which the calculation means samples the input voltage signal, an input voltage signal and an output voltage signal of which output voltage has been detected, and obtains the ON time and the OFF time determined by the calculation means immediately therebefore and, on the basis of the obtained input voltage signal, the output voltage signal, the ON time and the OFF time, performs a process to estimate an output voltage signal at the next sampling timing; and the calculation means samples the input voltage signal, the output voltage signal, the ON time, the OFF time and the output voltage signal estimated by the state variable estimation means, and performs the calculation process on the basis thereof.

7. The switching power supply device according to claim 6 wherein:

on the basis of the obtained input voltage signal, the output voltage signal, the ON time and the OFF time, the state variable estimation means performs a process to estimate an output voltage signal at the next sampling timing and a voltage drop component caused by parasitic impedance which exists on a path on which an output current flows; and the calculation means samples the input voltage signal, the output voltage signal, the ON time and the OFF time, and the output voltage signal and the voltage drop component estimated by the state variable estimation means and performs the calculation process on the basis thereof.

8. The switching power supply device according to claim 7 wherein, in the control function formula defined in the calculation means, the relationship between the output voltage and the output differential value is prescribed by a negatively sloped linear function formula.

9. The switching power supply device according to claim 8 wherein, in the control function formula defined in the calculation means, the output differential value is prescribed to be constant irrespective of the output voltage in a range in which a difference between the output voltage and the target value exceeds a predetermined value.

10. The switching power supply device according to claim 9 wherein the calculation means calculates both the ON time and the OFF time such that the total of the ON time and the OFF time becomes constant.

11. The switching power supply device according to claim 10 wherein:

when the ON time and the OFF time determined by the calculation means exceed the maximum time ratio which is variable as an ON-time ratio, the drive pulse generation means generates a drive pulse with which the main switching element is turned ON or OFF at the maximum time ratio; and when the ON time and the OFF time determined by the calculation means are below the minimum time ratio which is variable as an ON-time ratio, the drive pulse generation means generates a drive pulse with which the main switching element is turned ON or OFF at the minimum time ratio.

12. The switching power supply device according to claim 9 wherein the calculation means calculates the ON time such that the OFF time becomes constant.

13. The switching power supply device according to claim 9 wherein the calculation means calculates the OFF time such that the ON time becomes constant.

14. The switching power supply device according to claim 9 wherein the calculation means calculates both the ON time and the OFF time such that the ON-time ratio to the switching cycle becomes constant.

15. The switching power supply device according to claim 14 wherein:

when the total value of the ON time and the OFF time determined by the calculation means exceeds the maximum time which is variable, the drive pulse generating means generates a drive pulse which turns the main switching element ON and OFF in the maximum time; and when the total value of the ON time and the OFF time determined by the calculation means becomes shorter than the minimum time which is variable, the drive pulse generating means generates a drive pulse which turns the main switching element ON and OFF in the minimum time.

16. The switching power supply device according to claim 1 wherein a composite constant constituted by a combination of a plurality of the circuit constants is defined, and the parameter estimation is performed in a unit of the composite constant.

17. The switching power supply device according to claim 16 wherein the parameter estimation on the basis of the circuit constant or the composite constant is performed using the off-line least square method.

18. The switching power supply device according to claim 16 wherein:

the power converter circuit is a step-down chopper circuit provided with the main switching element which turns an input voltage ON and OFF, a rectifying element which is turned ON and OFF complementarily with the main switching element, and a smoothing inductor and a smoothing capacitor which smooth intermittent voltages at both ends of the rectifying element;

in the calculation processing circuit, a switching cycle T of the main switching element, inductance L of the smoothing inductor, capacitance C of the smoothing capacitor, the output current Io and the composite constants p and Vofs defined by the following Formulae (1) and (2) using a resistance value R of parasitic resistance of the smoothing inductor are initially set as default values, $$p = \frac{T^2}{2 \cdot L \cdot C} \quad (1)$$

$$Vofs = -\frac{T^2}{L \cdot C} \cdot R \cdot Io \quad (2)$$

the calculation means periodically updates the composite constants p and Vofs by parameter estimation during a power supply operation;

the parameter estimation is performed by the calculation means which obtains each value of output voltage signals Vo(k), Vo(k−1), Vo(k−2), and input voltage signals Vi(k−2) which are detected values sampled for each timing t(k), t(k−1) and t(k−2), and obtains each value of δ(k−1) and δ(k−2) calculated as the time ratio for each timing t(k−1) and t(k−2), and calculates the composite constants p and Vofs with which an evaluation function J(N) represented by the following Formulae (3) to (5) including the each value becomes the minimum.

$$J(N) = \frac{1}{N}\sum_{k=1}^{N}[v1(k) - p \cdot v2(k) - Vofs]^2 \quad (3)$$

$$v1(k) = Vo(k) - [2 \cdot Vo(k-1) - Vo(k-2)] \quad (4)$$

$$v2(k) = \quad (5)$$
$$-Vo(k-1) - Vo(k-2) + Vi(k-1) \cdot \delta(k-1) + Vi(k-2) \cdot \delta(k-2).$$

19. The switching power supply device according to claim 18 wherein the calculation means causes slight diffusion and fluctuation of the ON time and the OFF time determined through the calculation process for every timing at which the parameter estimation is performed, and samples each signal during a period during which the output voltage is fluctuated by the diffusion fluctuation to perform the parameter estimation.

* * * * *